FIG. 1.

Electron Micrograph of Product 18 (CoMoO₄- Al₂O₃, 6 Hrs. at 1000°F.)
Magnification: 200,000 Diameters          Pore Radius = 13 Å

FIG. 4.

INVENTORS.
JAMES A. ANDERSON JR.,
JAMES A. DINWIDDIE,
MAX A. MOSESMAN,
LONNIE W. VERNON,
BY
ATTORNEY.

Electron Micrograph of Product 19 ( $CoMoO_4$- $Al_2O_3$, 24 Hrs. at 1400° F.)
Magnification: 200,000 Diameters    Pore Radius = 33 Å

FIG. 5.

INVENTORS.
JAMES A. ANDERSON JR.,
JAMES A. DINWIDDIE,
MAX A. MOSESMAN,
LONNIE W. VERNON,
BY
ATTORNEY

2,890,162
POROUS SILICA FREE GAMMA ALUMINA BASE CONTACTING AGENTS AND USE THEREOF

James A. Anderson, Jr., James A. Dinwiddie, Max A. Mosesman, and Lonnie W. Vernon, Baytown, Tex., assignors, by mesne assignments, to Esso Research and Engineering Company, Elizabeth, N.J., a corporation of Delaware Application February 28, 1955, Serial No. 490,732

10 Claims. (Cl. 208—46)

The present invention is related to improved porous contacting agents, their preparation, and their use in various contacting operations. It has particular application to the use of substantially silica-free porous products having improved pore distribution and size characteristics in the contacting and catalysis of mixed molecules.

Briefly, it has been found that the efficiency and effectiveness of contacting operations, particularly those involving mixtures of molecules having a relatively wide range of molecular sizes, is markedly improved by employing as contact agent a porous solid containing at least one added active metal component, the final solid having a favorable relationship between the most frequent pore diameter ($D_f$) in Angstroms (A.) and the spread of the range of the more frequent pore diameters in A. ($\Delta D_R$). More specifically, the invention contemplates porous solid alumina-base contacting agents wherein this relationship, termed the pore size distribution factor (PD), is above 5, determined as follows:

$$PD = \frac{(D_f)^2 \times \Delta D_R}{10^4}$$

Especially preferred porous solids are those having a $D_f$ of above 60 A. and a $\Delta D_R$ of at least about 10 A. These contact agents find particular utility in contacting mixtures of relatively large sized organic molecules, such as those boiling above about 450° F. and in contacting molecules of various sizes at high space velocities. For a given feed stock, it is preferred to select a contact agent such that the ratio of the PD factor to the feed stock average molecular diameter in A. is above about 0.1:1 and the ratio of $D_f$ to the feed stock average molecular diameter is above 1:1.

Considerable work has been carried out in the prior art to develop useful contacting agents for catalytic conversion operations and the like. This work has been chiefly directed to operations involving relatively small molecules, and principal attention has been given to chemical activity of the agent. While it has been long recognized that the physical structure of such materials plays an important role in effectiveness, the extent to which structure is important has been obscured by complexities of catalyst preparations and composition as well as of the processes using them.

Increasing emphasis is being placed on catalytic processes involving large molecules, i.e., molecules having molecular diameters of above about 25 A., and it has become more and more apparent that physical structure of the catalyst plays a primary role in operation efficiency. In this connection, some attention has been given by prior art workers to the effect of pore size on catalyst activity, but the method of determining and reporting pore size data have been too inconsistent to lead to firm conclusions.

In studies carried out on complex, high molecular weight hydrocarbons, it was found in this work that catalysts having high activity for small molecules were quite inadequate for similar conversions with large molecules at commercially feasible reaction conditions of contact time, temperature, etc. For example, in conducting desulfurization operations on gas oils in the presence of hydrogen and a conventional cobalt molybdate on alumina catalyst, it was found that only at excessively low, commercially unattractive, hydrocarbon feed rates could a high degree of desulfurization be obtained. Subsequently, it was found that heat treating such catalysts at elevated temperatures, such as about 1400° F., greatly improved desulfurization activity. However, anomalous results were obtained; some catalysts would respond to heat treatment, others would not, even though the catalysts had substantially the same compositions. Even catalysts prepared by the same method would show widely different activities when heat treated at the same temperature.

It was then recognized that these differences in activity must be in large part due to physical structure differences rather than inherent "chemical" or catalytic activity differences. Since the usual physical examination of catalysts by specific surface determinations, X-ray diffraction analysis, etc. did not provide an independent measurement correlating with the enhanced activity of the heated catalysts, catalyst-pore structure was investigated. Pore size distribution curves were then obtained by the application of the Kelvin equation to the desorption branch of the low temperature nitrogen isotherm; the isotherm data were also used to calculate specific surface, pore volume, and average pore size (as will be discussed below in Section II). There was a marked increase in the most frequent pore diameter ($D_f$) and a wider spread of more frequent pores ($\Delta D_R$) for catalysts having improved activities. It was further found that $D_f$ and $\Delta D_R$ determined by this method checked such values determined by statistical analysis methods from electron micrographs made of the catalysts at a total magnification of 200,000 diameters.

A study of these factors as applied to various types of operations involving various types of feed stocks lead to a number of important observations laying the basis for this invention. In operations involving mixed molecules, porous contact agents having a PD factor of above 5 are preferred, with values above 10, and especially of above 20, being most suitable. It is preferable to select a catalyst for a given feed stock such that the ratio of the PD factor to the average molecular diameter in A. of the feed stock is from about 0.1:1.0 to 3:1, preferably in the range of 0.25:1 to 1.5:1. For a contact agent having a given $D_f$, $\Delta D_R$ values of above about 10 A., especially above 20 A., and more especially above 30 A. are to be preferred. For a given feed stock to be treated by the contact agent, a relatively wide range of $D_f$ values may be used, depending on such factors as contact time, temperature, activity and the like employed during the contacting step. However, it is preferred that the $D_f$ be larger than the average molecular diameter in A. of the mixed molecules, with an especially useful ratio being above 1.2:1, more especially below 4:1 and preferably in the range of 1.5:1 to 3.5:1. It is also preferred with certain feed stocks that the $\Delta D_R$ of the contact agent be at least 0.5 times the spread in A. of the molecular diameters between the 10% and 90% fractions of the feed stock. Contact agents having $D_f$ values of from 60 A. to 400 A. find special utility. The contact agents of the present invention contain at least one added catalytically active, metal-containing reagent to form active, superior catalysts for use in various types of conversion operations such as those involving hydrogenation, dehydrogenation, hydrocracking, hydrodesulfurization, hydroforming, reforming and the like reactions.

The contact agents of the present invention, in contrast to prior art materials, permit the use of higher space velocities or lower temperatures when employing otherwise constant conditions for a given feed stock, permit the use of larger particles of contact agents in fixed bed and other operations, whereby pressure drop is decreased when using heavy or viscous materials, and permit other improvements in contacting effectiveness and efficiency as will be discussed hereinafter.

Although it is not desired to be bound by any hypothesis or theory relative to the improvements effected in the practice of the present invention, the following matters are believed to play an important role in the improvements that have been observed. Studies of hydrocarbon molecules have indicated that frequently they are rod-like in shape with a tendency to become coiled up as molecular weight increases. Thus, a $C_{45}$ hydrocarbon is indicated to have a cross sectional diameter of about 4 A. and maximum linear dimensions of above 50 A. Therefore, with a conventional catalyst having micropores with average diameters on the order of 30 A. or less, the heavy molecule can enter the pore based on minimum cross section of the molecule but cannot enter based on its extended length. Thus, some net orientation is required for the heavier molecules. Statistically, it would appear then that since molecules exist in a relatively disordered state with orientations rapidly changing when they are in fluid state, some of the molecules will be able to enter the catalyst pore where others will not. Electron photomicrographs show that porous materials have a labyrinth of micropores interconnected in a complex fashion, and it is difficult to visualize the beginning or the end of the pore. It is considered that the reactants and products must necessarily use the same passages, and diffuse under oriented conditions in opposite directions. This, under steady state conditions the rate of permeation or diffusion into the pore must equal the rate of diffusion out.

This theory gives some basis for the desirability of increasing pore size for improving the efficiency of contact and increasing diffusion rate through the pores by decreasing the necessity for molecule orientation. However, increasing the range of distribution of the more frequent pores also plays an important part in improving efficiency of contact. Apparently, this improvement comes about by having a significant number of large pores of a wide distribution of diameters available for contact by the molecules of wide range in molecular sizes and in various states of orientation. Regardless of the basis for these improvements unexpectedly improved results are obtained by increasing the distribution of more frequent pores when employing a contact material of a given $D_f$ and particle size and of a given intrinsic activity or by increasing pore size within certain defined limits for materials of given pore distribution characteristics.

In contrast to the contact agents of the present invention, the catalysts employed by prior art workers for use in such types of conversion operations have been characterized by having relatively low, most frequent pore diameters and very low pore size spreads along with relatively high surface areas. The data in the following table present a comparison of the physical characteristics of porous catalysts evaluated by the present method and catalytic activity obtained in a gas oil hydrodesulfurization process.

| Product No.[1] | 6 | 4 | 5 |
|---|---|---|---|
| Catalytic Conversion Activity at High Feed Rates | Fair | Good | Good |
| Pore Data Determined by Present Method: | | | |
| Most Frequent Pore Dia., $D_f$, A | 43 | 60 | 114 |
| Range of More Frequent Pore Dia., $D_R$, A | 40-46 | 50-88 | 104-116 |
| Difference in Range, $\Delta D_R$, A | 6 | 38 | 12 |
| Pore Size Distribution (PD) Factor | 1 | 14 | 16 |
| Pore Data Determined by Prior Art Methods: | | | |
| Average Pore Diameter from Total Absorption, A | 86 | 120 | 170 |
| Range of Pore Diameters, A | 30-238 | 23-200 | 52-238 |
| Difference in Range, A | 208 | 177 | 186 |
| PD Factor [2] | 155 | 255 | 538 |

[1] All products were prepared by the same procedure and with the same materials; contained 15 weight percent $CoMoO_4$ on granular gamma alumina; and were all given a final heat treatment for 24 hours at the temperatures shown. Preparation of the various products is described in Section I infra.

[2] Calculated by present method from prior art data.

Product 6, which has physical characteristics representative of prior art catalysts, gave much poorer performance at relatively high feed rates for a given feed stock than either product 4 or 5. Products 4 and 5 had about the same activities at intermediate feed rates. Since all the products had the same chemical composition, the difference in activity lies in differences in physical properties. These differences were found by the present method of analysis and data interpretation. The gradually increasing $D_f$ values explained only in part the improvements, but the high $D_f$ value for product 5 would indicate it to be much superior to product 4, which was not the case. On the other hand, $\Delta D_R$ alone would not serve as a suitable criterion because it would indicate product 4 to be much superior. The use of a pore size distribution factor, which takes into account both $D_f$ and $\Delta R_R$, was then found to be a useful tool for explaining the similarity in activities of products 4 and 5 and for showing their superiority over product 6.

Prior art methods of interpreting pore data could not be used to explain the differences. In the first place, average pore diameters determined by conventional total nitrogen adsorption methods and the like give values up to two or more times higher than the present method, and even the relative differences are not proportional to changes in $D_f$. Furthermore, taking a range of pore diameters in the porous solid is misleading, since product 6 would show a much wider range than either of the others, whereas it actually shows the lowest activity and spread of significant pores. If a PD value is calculated from prior art data, misleading results are obtained, because such data would indicate a vast superiority for product 5, which was not the case.

In general, it may be concluded that considerable confusion exists in the prior art with regard to method of measuring and reporting pore sizes, with regard to the significant aspects of pore distribution, and with regard to certain physical characteristics of catalysts that are important in determining their utility for contacting mixed molecules. The present invention is a substantial contribution to the art in showing the relationships between pore size and pore distribution that lead to the formation of superior contacting agents, and to a clarification of the confusion that exists in the prior art.

The practice of the present invention will be described in more detail in the following description and examples taken in conjunction with the figures in which.

A variety of procedures may be employed for preparing the porous contact materials of the present invention. In general, a convenient method is to form a porous base material having a low PD factor such as below about 3, by one of the conventional prior art procedures and to heat the base material under carefully controlled pore size and/or distribution growth promoting conditions to achieve a pore size distribution factor in the desired range. In a preferred procedure, the porous material is heated in the presence of a pore growth promoter admixed with or impregnated therein to achieve the desired result. Pore growth promoting conditions include heating the material in the presence of air and/or an auxiliary metal or metallic compound, steaming at elevated temperatures, treating with hydrogen at elevated temperatures, and the like as will be explained in more detail hereinafter. The set of conditions chosen for this operation will vary, depending on the stability, crystalline structure, chemical composition, and other characteristics of the porous material being formed. The active catalytic agent to be employed in the finished product may be deposited on the porous material before or after the pore size and/or distribution growth step has been completed. It is generally preferred that the catalytic component be impregnated prior to the pore size-distribution growth step in order to avoid any possibility of impairing the PD factor of the material. However, the active catalytic agent is sometimes preferably added after this treating step with beneficial results, especially where the activity of the catalytic agent may be impaired during the treating step. An especially suitable and preferred embodiment of this invention comprises impregnating the porous starting material with a metal component that serves both as an active catalyst ingredient and as a pore size distribution growth promoter.

In this latter connection, a preferred embodiment is that of preparing superior catalysts from gamma-type aluminas, which are articles of commerce and can be secured as such. Gamma alumina is not known to occur in nature, but may be formed by careful dehydration of certain alumina hydrates, for example from alpha alumina monohydrate or alpha alumina trihydrate. In this transition the initial hydrates which are fairly crystalline materials are converted to a substantially amorphous form. The surface area of conventional gamma alumina is generally of the magnitude of about 200 square meters per gram or higher. The crystallites in gamma alumina are frequently resistant to coalescing at temperatures ranging up to 1200° F. and even higher. However, at sufficiently high temperatures gamma alumina is converted to the form of alpha alumina. Alpha alumina is thermodynamically stable and cannot be converted to any other form of alumina on further heating.

Alpha alumina generally has substantially no catalytic activity and is characterized by a low surface area of the order of less than about 20 square meters per gram. It is, therefore, desirable to avoid formation of alpha alumina in preparing large pore gamma alumina-base materials. The gamma alumina to be employed in catalyst preparation is preferably a substantially pure form of gamma alumina.

Various techniques may be used to prepare low pore size aluminas. In one of these techniques, an almina gel may be particulated and placed in drying pans under controlled dehydration conditions. In another technique a slurry of alumina gel may be exposed in the form of a spray to a dehydrating gas stream at high temperatures. An alumina resulting from this process is generally referred to as spray dried alumina. However, the process of this invention is applicable to variously processed aluminas. It is preferred to employ a granular form rather than a spray dried form of alumina.

Certain chemical impurities are generally to be excluded from the alumina support. This statement is particularly true of silica which is often contained in alumina due to the source or method of preparation of the alumina. As will be developed, silica is preferably excluded from the alumina, and generally, amounts of silica should not exceed about 0.5, based on the total alumina.

To secure the desired transition in physical properties of alumina, a suitable agent may be added to promote the physical changes. Molybdenum, especially as a compound of oxygen, is suited as the promoter. Molybdenum trioxide is particularly attractive for this purpose although other forms of molybdenum can be employed including the soluble salts such as ammonium molybdate. As will also be brought out, mixtures of oxygen compounds of cobalt and molybdenum, such as the oxides, are useful. These may be present as separate oxides or as a complex, or as a compound such as cobalt molybdate. It should be observed, however, that cobalt oxide alone is less preferred as a promoter, although not preventing the effect of molybdenum mixed with it. It is within the concept of this invention to employ other promoters for the change in physical properties of alumina and the like.

The alumina containing the promoter of the character identified is heated at temperatures in the range of about 1350° to 1550° F., preferably about 1400° to 1500° F. for a period of about 4 to 36 hours in a stream of dry gas, especially a free oxygen containing gas such as dry air, until a porous material having the desired PD factor is obtained. This results in substantial changes in the structural nature of the alumina. The upper limit of the temperature of heating is important if complete transition to alpha alumina or undesirable conversions of active catalyst components are to be avoided; for example, gamma alumina may be converted to alpha alumina at temperatures somewhat above 1550° F. and at heating periods as short as 6 or 10 hours.

Prior to heating in the range of about 1350° to 1550° F., the composite may have been dried by heating up to 24 hours in the range from 300° to 1100° F.

Another useful method for forming a material having a relatively wide $\Delta D_R$ for a given $D_f$ comprises forming a porous alumina preferably containing a promoter, and depositing an oxidizable material thereon, such as carbon, carbonaceous materials and the like. This may be done by using the solid as a catalyst under conversion conditions with a hydrocarbon such that carbon deposits, such as 0.1 to 5% based on the solid, are formed thereon. The solid is then subjected to oxidizing conditions, such as with air or other oxygen containing gas, to burn off the oxidizable material. This reaction is usefully carried out at a temperature in the range of about 900 to 1250° F. after this reaction is completed, the solid is then heated in a second step at an elevated temperature such as in the range of 1350° to 1550° F. for 6 to 36 hours to obtain a solid having a high PD factor.

Since rate and extent of heating are frequently difficult to control and are not suitable criteria of extent of pore growth and/or distribution, the material should be tested by procedures to be set out hereinafter to determine its final $D_f$ and $\Delta D_R$, an such information should be used as the final criterion of the porous nature of the catalyst.

The promoter for changes in the physical properties of the alumina may be used in the concentration range of about 0.1 to 10 weight percent preferably 0.5 to 5% although amounts greater than this may be employed if desired. The promoter may be included with the base material at any stage of preparation provided the promoter is present during the final conversion step described above. For example, a soluble form of molybdenum such as ammonium molybdate may be mixed with the alumina to be processed to form the high PD alumina. Again the compound of molybdenum employed as a promoter may be mulled with alumina prior to the heat treatment. The molybdenum compound can be impregnated on the alumina in other ways.

In the event the final catalyst desired employs a form of the promoter as the catalytic agent, this compound can be used as the promoter during the specific heat treatment required. Alternatively, however, the promoter employed to secure the desired change in the form of the base may be removed from the base after the required heat treatment. Removal of the promoter may be secured in a number of ways including solvent extraction, volatilization, chemical leaching or the like. By this technique it is possible to condition a base material so as to have the pore distribution properties so that it can be used as the base for any desired catalytic agent.

Suitable large pore gamma aluminas may be derived from the various alumina hydrates or from the small pore gamma aluminas readily obtainable by conventional dehydration procedures from these hydrates. Since some aluminas respond more readily to heat treatment than others, care must be taken in the conversion process to avoid overheating which will produce low surface area-inactive bases. Under certain conditions, aluminas such as gibbsite and bayerite may be heated by themselves in the absence of a promoting material at elevated temperatures, such as above about 1300° F. to produce the desired pore size distribution characteristics. However, it is usually preferred to incorporate a metal-containing promoter, such as molybdenum or a suitable form thereof, in such aluminas prior to the heating step.

Another procedure to be considered in this connection is that of heating the base materials in the presence of steam at pressures from atmospheric to 1000 p.s.i.g. or higher, at temperatures in the range of, for example, about 500 to 1500° F. for a time in the range of from about 6 to 36 hours, the time, temperature and pressure being chosen to obtain the optimum relationship between pore size and pore distribution.

Although the finished contact agents of the present invention preferably have $D_f$ values from about 60 up to 300 A., those even higher, such as below about 400 A., are contemplated.

In order to make these pores such as those having below about 500 A., in diameter more readily accessible to large molecules, various methods may be employed to introduce extremely large pores, such as those with diameters above 1000 A., into the solid. For example, the larger pores may be introduced during the initial preparation of the base material or during the actual conversion of the base to the structure having wide pore distributions as herein defined. In one procedure a base material from which the final support is to be prepared, such as gamma alumina, is treated with a strong acid such as a mineral acid including HCl, $H_2SO_4$, $HNO_3$, HF, or a strong organic acid such as acetic acid, and the like prior to the final conversion step. In the acid extraction step, the acid strength is adjusted to a desired level, such as from 1 to 6 normal, and then is intimately contacted with the material, following which it is withdrawn and extraneous acid is washed from the acid-treated solid. Following this step, the acid-treated material may be impregnated with a metal-containing promoter and heated by one of the foregoing described procedures to prepare a finished base having a high pore size distribution factor. This procedure is most applicable in those cases where the material to be treated with an acid does not contain a substantial portion of acid soluble components such as active catalytic ingredients and the like.

Another procedure for increasing the amount of extremely large pores in the contact material is that of incorporating a relatively large amount of a removable material into the solid during the initial stages of preparation, and subsequently to remove this material therefrom. Preferably, such large pore-forming materials employed for this purpose are more volatile than the supporting material or other ingredients that are to be present in the finished porous solid. On the other hand, they may be a solid material that is decomposable to gases upon heating to a temperature that does not cause objectionable changes in the structure of the supporting material or other constituents and that will not impair formation of pores which determine the PD characteristics of the solid. Preferably, such material is not a solvent for and is immiscible with the components of the supporting material.

In specific applications of this embodiment, the removable solid is intimately mixed or otherwise introduced into the supporting material and the material is heated under the conditions heretofore specified to obtain a finished material having a high PD factor and at the same time possessing a substantial portion of extremely large pores. For example, such materials as hydrogenated corn oil, maleic anhydride, ammonium compounds such as ammonium carbonate, ammonium oxalate, and the like, naphthalene, anthracene, and other volatilizable aromatics, various hydrazines such as hydrazine oxalate and the like may be used. These materials may, for example, be added to the pulverized catalyst having a low PD factor, the mixture then being pilled into desired shapes, following which the heating step is carried out both to volatilize or decompose the removable solid and simultaneously to form a material of high PD factor.

The amount of such removable solid used during this preparation step will depend on such factors as the extent to which it is desired to introduce extremely large pores into the substance, the final crushing strength desired and the like. Excessive amounts of such removable solids frequently cause the formation of catalysts having very low strengths even though higher activities are achieved. Generally, amounts in the range of about 1 to 15% or even higher of the removable solid may be used, but preferably amounts below about 10% based on the total mixture are employed.

A variety of catalytic components and/or pore size distribution growth promoters may be used in conjunction with the foregoing porous bases. Such materials include various metals, metal oxides, metal salts and the like. The type of metallic component used will depend on several factors, most important of which will be the specific final use for which the contact agent is contemplated which will take into consideration the types of materials to be treated with the contact agent, the degree of activity desired and other factors.

In the event the catalytic component is impregnated on the porous support prior to the conversion step to a large pore-high pore distribution material, it will be necessary to consider the pore growth promoting and inhibiting characteristic of the specific metal component used, since a number of materials that are eminently suitable as active catalytic components inhibit the formation of high PD materials. In some cases it may be desired to employ comparatively small amounts of a pore size distribution growth inhibitor with or without a promoter to aid in controlling the extent to which the PD factor increases.

Among the suitable additives that may be used for promoting pore size distribution growth and/or for acting as active catalytic components of the finished contact agent are the various metals, mixtures of metals, metal compounds or mixtures of metal compounds or of one or more metals and one or more metal compounds. Such materials may or may not be in chemical combination with the porous solid on the surface thereof. Suitable metallic agents for these purposes include metal oxides, halides, sulfides, selenides, tellurides, phosphates, manganates, molybdates, chromates, bichromates and the like.

Suitable active components and promoters may comprise a metal or a catalytic compound of metals such as Pb, Sn, Bi, Al, Ge, Sc, Ti, V, Cr, Mn, Fe, Co, Ni, Cu, Zn, Y, Zn, Nb, Mo, Ma, Ru, Rh, Pd, La, Hf, Ta, W, Re, Os, Ir, Pt, Ac, Th, Pa, and U and the like. Excellent contact agents may also be obtained by incorporating at least one oxide, sulfide, selenide, telluride, halide, phosphate, manganate, molybdate, chromate or bi-chromate and the like in the surface of the support. In general, excellent materials can be obtained by incorporating one or more oxides, such as $MoO_3$, $CoO$, $NiO$, $Fe_2O_3$ and the like in the surface of the support. Some of these materials may be prepared by direct impregnation of the porous support with a solution of the metal compound which it is desired to incorporate in the surface thereof, while others can only be prepared indirectly, for example, by impregnation with one compound followed by a conversion treatment whereby said compound is converted to the desired compound.

The invention is not restricted to the use of contact agents containing any specific amount of the active metal or active metal compound. The optimum concentration of the active material will generally depend upon the particular material to be treated and upon the conditions of temperature, space velocity, etc., under which the contact operation is to be effected. In general, the porous support is in gravimetric excess of the active metal or metal compound. Good results may be obtained by employing compound catalysts containing from about 0.1% to about 40% by weight of the active metal or active metal compound. A suitable concentration range is generally from about 0.5% to about 20% by weight of the catalyst mass. In the case of the compound catalysts comprising a molybdate compound as the active agent, good results are generally obtained with catalysts containing from about 5 up to about 20% by weight, reported as molybdena.

The solid contact agents of the present invention may be employed for execution of any of numerous contacting operations and conversions. In general, the desired quantity of the contact material in the form of particles or granules of the desired size is packed into a tube or chamber of any suitable material and capacity, employed as a finely divided solid suspended in the fluid reactants, etc., but, as will be obvious to the skilled workman, the contact agents may be used in various other forms.

The contact agents of the present invention may be used in a variety of contacting operations, particularly where mixed molecules having a relatively wide range of molecular diameters are employed such as mixtures of organic compounds and the like. Such mixtures include normally liquid, semi-solid or solid hydrocarbons, such as paraffins, olefins, polymerized olefins, naphthenes, aromatics, naphthene-aromatics, etc., various fatty acids, especially the higher fatty acids, alcohols, especially the higher alcohols such as natural high molecular weight alcohols and those produced by the oxo process, ketones, aldehydes and the like. The improved catalysts have utility for conversion processes using or involving hydrocarbon mixtures such as naphthas, gasolines, etc., especially at space velocities much higher than attainable in the prior art under otherwise similar conditions.

These contact agents have particular utility in processes wherein the organic material to be improved or changed in composition has relatively large average molecular diameters such as above 30 A. or where the material boils well above about 450° F., especially those having mid-boiling points above 700° F. Thus, the catalysts are eminently suitable in treating processes involving high molecular weight hydrocarbons such as those derived from petroleum oil, including heating oils, catalytically cracked fractions, gas oils, distillates boiling in the lubricating oil boiling range, waxes, residua, deasphalted residua, asphalts, crude petroleum oils, reduced crude oils wherein lower boiling constituents such as heating oils and lower boiling hydrocarbons have been removed, high molecular weight polymers, and the like. Conversion operations applying to other types of hydrocarbons which are essentially hydrocarbon mixtures such as shale oils and various derivatives thereof, hydrogenated coals, coal tar fractions, products from the hydrogenation of carbon monoxide and the like are also contemplated within the practice of the present invention.

The various types of contacting operations contemplated herein includes those employing a porous solid containing an active metal catalyst component such as desulfurization, color improvements or decolorizing, hydrocracking, hydroforming of naphthene hydrocarbons and the like, polymerization of olefins, depolymerization of polymers, alkylation, dealkylation, disproportionation, reforming of naphthas, isomerization of paraffins and the like, aromatization of paraffins and the like, hydrogenation, dehydrogenation, various types of hydrofining operations in which one or more characteristics are improved by treatment of the feed stock with hydrogen in the presence of a catalyst, oxidation of organic compounds with an oxidation medium such as an oxygen-containing gas including air, adsorption and absorption operations and other contacting conversion and separation processes.

The above types of operations may be conducted with a fixed bed of contact agent in which the material to be converted or contacted is passed through the bed under suitable contact conditions of pressure, temperature and feed rate, or the solid agent may be used in a finely divided fluidized state suspended in the vaporized or liquid material, or it may be used in the form of a moving bed passing through the fluid materials by procedures well known to the art.

The improved contact agents have particular application to fixed bed operations wherein particle size may be a limiting factor because of the high pressure drop through the fixed bed such as is due to the viscous nature of the material being treated. For example, in treating heavy lubricating oils, asphalts, residua and the like, catalysts subdivided into 10 to 20 mesh particles may have twice the activity of ⅛" x ⅛" pills, but the smaller particles may lead to commercialy unfeasible pressure drops through the catalyst bed. This, therefore, frequently necessitates the use of larger particles or of extremely low space velocities. Under such conditions, the accessibility of the pores in the individual particles is poor with conventional contact agents having small pore diameters and narrow pore size distributions. By employing the agents of the present invention, it has been found that space velocities may frequently be increased by two or more times to achieve the same degree of effectiveness in comparison with the prior art materials having the same intrinsic chemical composition, activity and particle size. However, it is to be emphasized that the contact agents of the present invention may be used in a wide range of particle subdivision such as those from as low as 10 microns or smaller up to pills as large as ¼" x ¼" or even larger, depending on the type of process being used, the feed stock being contacted, and the activity of the particular agent being employed.

The contacting operations will be carried out at a set of conditions conducive to achieving the improved result desired, bearing in mind the type of feed stock, contact agent and processing equipment used. In general, the processes may be carrier out at temperatures ranging from as low as about 30° F. or even lower up to as high as 2000° F. or higher with pressures ranging from atmospheric or lower up to 5000 or higher p.s.i.g. Liquid space velocity may vary from about 0.1 v./v./hr. or lower up to as high as 20 to 30 v./v./hr. However, the contacting agents of the present invention have special utility for operations conducted at relatively high space velocities above 1.0 v./v./hr., especially above 1.5 v./v./hr., and more particularly in the range of about 2 to 10 v./v./hr. The contacting operations may be carried out in the presence of various types of auxiliary diluents and reactants such as various gases including hydrogen, nitrogen, air, $CO_2$ and the like, and lower boiling hydrocarbons and hydrocarbon gases such as methane, ethane, naphtha fractions and the like.

In conducting catalytic conversion operations on hydrocarbons in the presence of added hydrogen, to which the catalysts of the present invention are particularly suited, especially above 1.0 v./v./hr., temperatures may range from about 400° up to as high as 1000° F. Elevated pressures on the order of 200 to 5000 p.s.i.g. are generally useful. Hydrogen rates in such operations may vary from as low as 100 up to 10,000 or more standard cubic feet of hydrogen per barrel of feed.

In conversion operations employing added hydrogen, there is sometimes a net consumption of hydrogen, generally below about 500 cubic feet of hydrogen per barrel of feed, depending on the types of reactions taking place. Such reactions may include desulfurization in which complex sulfur-containing hydrocarbon molecules are decomposed into hydrogen sulfide and lower boiling hydrocarbons, decomposition of complex nitrogen compounds, hydrogenation of unsaturated hydrocarbons, decolorization reactions in which color bodies are decomposed or converted to substantially colorless bodies, various types of hydrocracking reactions in which complex heavy molecules are cracked and hydrogenated simultaneously, and other reactions of this type. In some reactions the hydrogen may act as a cracking and coking suppressor, such as in hydroforming, and dehydrogenation of certain molecules such as naphthene molecules occurs without any substantial net consumption of hydrogen. Such reactions are well known to those versed in the art.

In such hydrotreating operations, molybdenum-containing alumina base catalysts are particularly useful. In such cases the molybdenum may be in the form of molybdena, cobalt molybdate, cobalt oxidemolybdena complexes and the like impregnated in or deposited on the surface of the alumina by the procedures heretofore described and to be shown in the examples hereinafter. In such reactions when hydrodesulfurizing gas oils, temperatures in the range of about 600° to 800° F., pressures of about 200 to 1000 p.s.i.g., and liquid space velocities of about 0.5 to 5 v./v./hr. are particularly useful. In hydrofining lubricating oils, similar conditions may be used for desulfurization and decolorization.

Cracked naphthas may suitably be desulfurized with the catalysts of the present invention at reaction temperatures in the range from 600° to 800° F., pressures from 50 to 200 p.s.i.g., liquid space velocities of 1 to 10 v./v./hr., and hydrogen rates of 500 to 1000 s.c.f./bbl. of feed. Undesirable side reactions may thus be minimized.

The catalysts of the present invention are quite suitable for hydrocracking residua and other asphalt-containing materials to lower boiling distillates and oils. It has been found that the present catalysts give useful products at lower temperature, with longer periods between regeneration and with a longer catalyst life or a higher conversion level for a given temperature than the prior art catalysts. In such operations, the reaction may be carried out at a temperature in the range of about 600° to 850° F., pressure in the range of about 200 to 2000 p.s.i.g. or higher, liquid space velocity of 0.25 to 5 v./v./hr. and hydrogen rates of about 500 to 5000 cubic feet per barrel. The residua used in such operations may be the vacuum residua obtained after distilling off the lubricating oil fractions from petroleum crude oils. These conditions, however, also apply to deasphalted oils, reduced crudes and crude oils where it is desired to convert higher boiling components to lower boiling useful products. The products from such operations may be distilled, deasphalted, solvent-extracted, or otherwise treated by well-known means to produce superior gasolines, heating oils, gas oils, or lubricating oil fractions.

In hydroforming processes, the porous catalyst of the present invention may have as the active component chromia or molybdena on a base of alumina. Molybdena on alumina is preferred, and may be prepared as described herein. The catalyst may contain 5 to 15% $MoO_3$. The feed stocks employed in hydroforming may be naphthenic virgin naphthas boiling in the range from 150° to 450° F. Olefinic fractions, such as cracked naphthas in the same boiling range may be charged in admixture with virgin naphthas. Hydroforming with the catalysts of the present invention is preferably carried out at temperatures in the range from 800° to 975° F., pressures of 100 to 400 p.s.i.g., liquid space velocities of 1.5 to 4 v./v./hr. and hydrogen to oil mole ratios of 1 to 4:1. In fixed bed operations, 2 to 4 or more reactors may be employed in series. The reactors are periodically regenerated by controlled combustion. Hydroforming may also be carried out in a fluidized catalyst system.

Similar to hydroforming, catalytic reforming may be carried out with a supported noble metal catalyst, e.g. platinum or palladium supported on gamma alumina. To prepare such a catalyst according to the present invention, it is preferred to prepare an alumina base having the desired physical characteristics of $D_t$, $\Delta D_R$ and PD, and then impregnate the noble metal component thereon in concentration from 0.1 to 10%, preferably less than 1%. The feed stocks suitable for noble metal reforming are the same as those mentioned for hydroforming. Preferred conditions are temperatures from 800° to 975° F., pressures from 100 to 800 p.s.i.g., liquid space velocities from 1 to 6 v./v./hr., and hydrogen to oil mole ratios of 1 to 4:1.

By employing the catalysts of the present invention in hydroforming and noble metal reforming processes, greater selectivity to gasoline boiling range product and less carbon make for a given octane number product may be achieved because of the greater accessibility of reaction surface and minimization of side reactions. Also the process may be operated at higher space velocities and/or lower reaction temperatures, compared to one employing conventional catalyst, to achieve the same octane number product, because of the higher rate of diffusion to and from the active surfaces in the catalyst of the present invention.

The catalysts of the present invention may be suitably employed to promote dehydrocyclization or aromatization reactions. The feed stocks in these reactions generally are paraffinic hydrocarbons of 6 to 8 carbon atoms essentially in a straight chain, or a petroleum fraction rich in such hydrocarbons. Dehydrocyclization or aromatization over catalysts of the present invention is preferably carried out at temperatures from 900° to 1050° F., pressures from 10 to 200 p.s.i.g., and liquid space velocities from 0.5 to 2 v./v./hr. Hydrogen may be employed in the ratio of 1 to 4 moles per mole of hydrocarbon. Chemical compositions of suitable catalysts are chromia supported on alumina (10% to 20% $Cr_2O_3$), molybdena supported on alumina (5% to 15% $MoO_3$), iron oxide on alumina, and noble metal, such as platinum or palladium on alumina. The chromia-alumina catalysts may be promoted with small amounts of potassium and and cerium, jointly or separately.

The catalysts of the present invention may be employed to promote isomerization of gasoline boiling range hydrocarbons. The feed stocks may suitably be paraffinic, naphthenic, or olefinic compounds or fractions preferably boiling in the range from about 100° to about 450° F. Chemical compositions of suitable catalysts are, for example, platinum on alumina (0.1 to 5% Pt). Suitable conversion conditions when employing the catalysts of the present invention, having one of the above chemical compositions, in isomerization of hydrocarbons are temperatures in the range from 600° to 800° F., pressures in the range from 100 to 600 p.s.i.g., liquid space velocities in the range from 0.5 to 4 v./v./hr., and hydrogen to oil mole ratios from 1 to 6:1.

It is pointed out that the above are only a few of the various types of processes in which the catalysts of the present invention may be employed with beneficial results. In general, it has been found that for a given set of reaction conditions and with a catalyst having a given intrinsic activity, operations of the above type may be carried out at much higher feed rates or at lower temperatures for a given feed rate than with the prior art catalysts.

The catalysts of the present invention are also generally much easier to regenerate in cyclic operations by conventional processes in which the catalysts containing carbonaceous deposits or the like are subjected to the treatment with air or other oxygen-containing gas than are the conventional small pore catalysts. This results because such oxidation reactions are diffusion controlled.

With reference to selecting a contact agent having the proper most frequent pore size and distribution characteristics, some knowledge of the boiling range or range of molecular diameters of the feed stock is desirable. One method of evaluating molecular sizes of large organic molecules is that of J. J. Hermans et al. (J. Chem. Phys., 20, 1360 (1952)) in which average effective molecular diameter in A is equal $7.4\ N^{1/2}$, wherein N is the number of carbon atoms in the molecule. Since various molecules have a variety of configurations and shapes, this procedure is chiefly useful for giving a relative indication of sizes. However, it provides a very useful tool for estimating average molecular sizes and spreads of sizes of feed stocks, and such data may be used for determining what pore size and distribution characteristics are need in a contact agent for a given feed stock. This method is therefore used herein as the basis for calculating average molecular diameters and spread of diameters of feeds. Generally, high boiling hydrocarbon mixtures have a relatively wide range of molecular diameters for the molecules present with significant frequency; i. e., a difference of more than 10 A. between the lower and higher significant diameters. In the practice of this invention, it is desired that the $D_f$ of the contact agent be well above the average molecular diameter of the feed stock, and as pointed out above, ratios of $D_f$ to feed average molecular diameter of above about 1.5 are preferred. Ratios of from about 2:1 to 4:1 or even higher are frequently most useful, but care must be taken to avoid excessively high ratios since this would mean a sacrifice in desirable surface or contact area.

The precise spread of more frequent pores in the contact agent ($\Delta D_R$) will depend to some extent on the range of molecular sizes in the feed stock, but generally will be at least 0.5 times the spread in A. between the average molecular diameter of the lightest 20% and the heaviest 20% of the feed, respectively, which is approximately the same as the difference in diameters between the 10% and the 90% components, as determined from the segregated fractions obtained by distillation, or other suitable methods for separating such mixtures into lighter and heavier molecular weight components. Especially useful results are obtained when the $\Delta D_R$ is 2 to 5 times greater than the spread of the 10 to 90% fractions. The $\Delta D_R$ should also exceed about 10 A., and preferably above 15 to 20 A. For example, especially useful materials will have $\Delta D_R$ values in the range of about 10 to 200 A., especially from about 10 to 100 A., and more especially from 20 to 100 A.

Since a variety of combinations of $D_f$ and $\Delta D_R$ may be used in a porous agent for contacting a given feed stock, it will be desirable to consider the optimum balance that will give the most favorable range of PD factors for the feed stock in question. For a feed stock that may be treated successfully with an agent having $D_f$ values in the range of about 60 A. to 120 A., for example, substantially equivalent results may be obtained by employing a relatively high $\Delta D_R$ for the lower $D_f$ catalysts and relatively low $\Delta D_R$ values for the higher $D_f$ catalysts, to obtain a desirable PD factor, such as within the range of about 10 to 30 for gas oils.

Desirable methods for determining the desirable ranges and balances of these properties for a contact agent to be used for a particular feed stock will be illustrated in more detail in conjunction with the procedures and examples discussed in the following sections.

I. PRODUCT PREPARATIONS

Descriptions of the methods used in preparing the porous products of the prior art and of the present invention are given in the following paragraphs. The numbers of the products will be used for identification purposes in the specification and examples.

*Product 1.*—This product was a commercial type cobalt molybdate catalyst supported on substantially silica-free, granular gamma alumina, and contained approximately 15 weight percent cobalt molybdate. It had been pilled in the form of ¼" pills using 3 weight percent graphite as a pilling aid following which it was heat-treated for 6 hours at a temperature of 1200° F. The ¼" pills were then ground and repilled as ⅛" x ⅛" pills, the ⅛" pills constituting product 1.

*Products 2–5.*—The following materials were prepared by heat-treating separate portions of product 1 at the indicated temperature for 24 hours in a flowing stream of dry air:

| Product No.: | Heat-treating temperature, ° F. |
|---|---|
| 2 | 1100 |
| 3 | 1250 |
| 4 | 1400 |
| 5 | 1500 |

*Product 6.*—This product, in the form of ⅛" pills, was another batch of commercial-type catalyst having the same chemical composition and prepared by the same procedure as product 1, following which it was heat-treated in a large batch for 24 hours at 1400° F. in the presence of moving dry air.

*Product 7.*—This product was a portion of product 1 that had been used in catalytic hydrocarbon conversion operations at elevated temperatures and was then air regenerated to remove carbonaceous deposits at 1100° F. A portion of the regenerated catalyst was heat-treated in the same manner as product 4, and was used in the form of ⅛" pills in these studies.

*Product 8.*—A portion of product 6 was heat-treated in a moving stream of dry air for 12 hours at 1500° F. It was in the form of ⅛" pills.

*Product 9.*—This product was prepared from material prepared in the same manner and having the same chemical composition as product 6, and was heated in the presence of moving air at a temperature of 1500° F. for 24 hours, followed by crushing and screening to obtain 10–20 mesh particles.

*Product 10.*—This was a commercially available silica-stabilized alumina-base catalyst containing about 3 weight percent CoO and 9 weight percent $MoO_3$. A portion of the catalyst was heat-treated in moving dry air for 4 hours at 1200° F. as recommended by the manufacturer. The catalyst was used in the form of ⅛" pills and contained about 5 weight percent silica.

*Product 11.*—A portion of the base material used to prepare product 10 was heat-treated in moving dry air at 1400° F. for 24 hours, and used in the form of ⅛" pills.

*Product 12.*—This was a commercially available low silica, cobalt molybdate on spray dried alumina catalyst containing about 3.0 weight percent CoO; 9.0 weight percent $MoO_3$, and 0.35 weight percent of silica. This catalyst had been given a heat treatment for 6 hours at 1112° F. and was in the form of ⅛" pills.

*Product 13.*—A portion of product 12 was heat treated for 24 hours at 1400° F.

*Product 14.*—A portion of product 12 was heat treated for 24 hours at 1500° F.

*Product 15.*—Gamma alumina was prepared by the following technique: An aluminum alcoholate solution was prepared by reacting alcohol and aluminum turnings and was then hydrolyzed by atmospheric moisture to form the alpha monohydrate (boehmite). The latter material was then dried in air, extracted with water to remove alcohol, and heated for 16 hours at 230° F. to form gamma alumina powder.

*Product 16.*—A portion of product 15 was heated for 24 hours at 1400° F.

*Product 17.*—A portion of product 15 was heated for 24 hours at 1550° F.

*Product 18.*—A portion of product 15 was heated for 6 hours at 1000° F. and then wet mulled with $$Co(NO_3)_2 \cdot 6H_2O$$

and $(NH_4)_6 Mo_7O_{24} \cdot xH_2O$ in an amount sufficient to yield a final product containing 15 weight percent $CoMoO_4$ on the alumina. The mulled mixture was dried for 24 hours at 230° F., heated for 11 hours at 500°–800° F., pilled to ⅛″ pills, and then calcined for 6 hours at 1000° F.

*Product 19.*—A portion of product 18 was calcined for an additional period of 24 hours at 1400° F.

*Products 20–22.*—These products were prepared as follows: A portion of product 15 was heated for 6 hours at 1000° F. and then was wet mulled with $MoO_3$, following which the mulled mixture was dried 16 hours at 230° F. and calcined for 6 hours at 1000° F. Three portions of this material were heat treated additionally as follows:

| Product No. | 24-Hour Heating Temp., ° F. | $MoO_3$ Content of Product, Wt. Percent |
|---|---|---|
| 20 | 1,450 | 11.48 |
| 21 | 1,500 | 7.83 |
| 22 | 1,550 | 6.89 |

*Products 23–25.*—These products were prepared by heating a portion of product 15 for 4 hours at 1000° F. and then wet mulling the material with sufficient $$Co(NO_3)_2 \cdot 6H_2O$$

to form a final product containing about 5.1 weight percent cobalt reported as CoO. The mulled mixture was dried for 24 hours at 230° F., heated for 11 hours at 500° F., and then calcined for 6 hours at 1000° F. Three portions of the calcined product were further heated as follows:

Product No.:     24-hour heating temp., °F.
23     1450
24     1500
25     1550

*Product 26.*—This was a commercially available 3 weight percent CoO—9 weight percent $MoO_3$ on low silica granular gamma alumina that was given a final heat treatment for 6 hours at 1112° F. It was used in the form of 3/16″ pills.

*Product 27.*—This product was obtained by heat treating product 26 for 24 hours at 1400° F.

*Product 29.*—This was a commercial type 15% $CoMoO_4$ on spray dried alumina that had been given a final heat treatment in dry moving air for 24 hours at 1500° F. It was used in the form of ⅛″ pills.

II. PHYSICAL STRUCTURE EVALUATIONS

In evaluating the physical structure of the products of the prior art and of the present invention, it was desired to avoid the weaknesses inherent in the rapid but misleading procedures so frequently used in the prior art. Accordingly, the procedures discussed in the following paragraphs were carefully developed from this point of view.

The specific surface area (S) of the products was determined by the method of Brunauer, Emmett and Teller (Journal of the American Chemical Society, 60, 309 (1938)). The results are reported herein as square meters per gram of product (m.²/g.).

Figure 1:
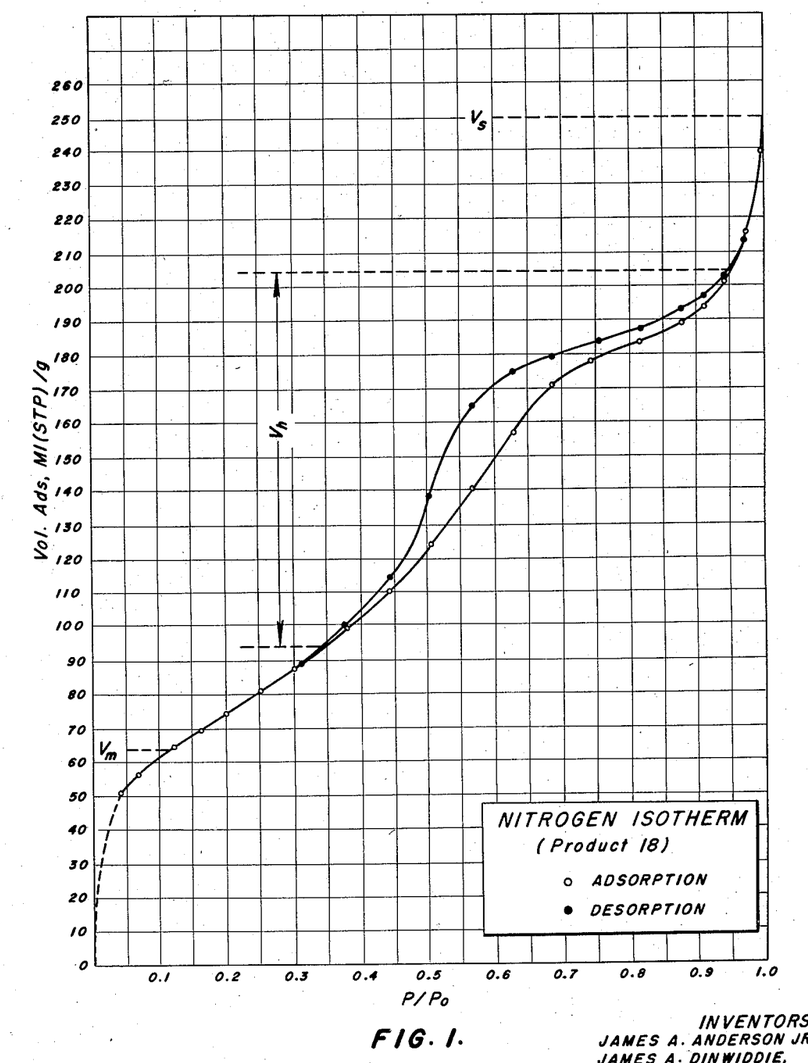
Fig. 1 is a nitrogen isotherm for product 18.

Information on the pore size and distribution was determined by first obtaining a complete low-temperature liquid nitrogen isotherm (adsorption and desorption) by conventional procedures. Figure 1 presents a complete nitrogen isotherm for product 18 in terms of relative pressure P/Po versus volume of nitrogen adsorbed, milliliters (at standard temperature and pressure) per gram. In this figure, the symbols $V_m$, $V_h$ and $V_s$ refer to monolayer, hysteresis and saturation volumes, respectively. P is the pressure at which the gas is adsorbed and Po is the vapor pressure of the adsorbing gas (nitrogen in this case) at the adsorption temperature.

In the next step, the volume adsorbed is read as a function of P/Po on the desorption branch of the hysteresis loop of the isotherm. These values are converted to Kelvin pore radii by the well known Kelvin equation (discussed for example in The Adsorption of Gases and Vapors, Physical Adsorption, by Brunauer, Princeton University Press, 1943, page 120) which follows $$\ln Po - \ln P = \frac{2\sigma V}{rRT}$$

where:

$\sigma$ = surface tension of nitrogen in dynes/cm.
$V$ = molar volume of nitrogen at temperature T
$T$ = adsorption temperature, ° absolute
$R$ = gas constant
$r$ = pore radius in Angstrom units (A.)

Since $\sigma$, V, T and R are constants, the radius is found as follows:

$$r = \frac{4.10}{\log Po/P}$$

The values of volume adsorbed per gram, P/Po and r for product 18 are shown in Table I below:

*Table I*

| Vol., ml./gram | P/Po | r, A. |
|---|---|---|
| 190 | .852 | 58.85 |
| 185 | .782 | 38.36 |
| 180 | .7025 | 26.76 |
| 175 | .6425 | 21.35 |
| 170 | .5985 | 18.39 |
| 165 | .565 | 16.53 |
| 160 | .544 | 15.51 |
| 155 | .530 | 14.87 |
| 150 | .5175 | 14.34 |
| 145 | .506 | 13.86 |
| 140 | .4945 | 13.41 |
| 135 | .484 | 13.01 |
| 130 | .475 | 12.68 |
| 125 | .466 | 12.36 |
| 120 | .450 | 11.99 |
| 115 | .4425 | 11.58 |
| 110 | .4275 | 11.11 |
| 105 | .405 | 10.45 |
| 100 | .3825 | 9.82 |
| 95 | .3525 | 9.05 |

Figure 2:
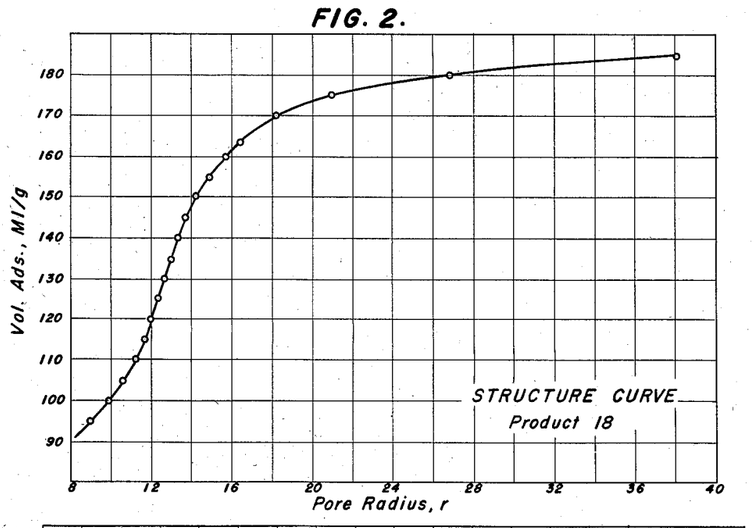
Fig. 2 is a structure curve for product 18 in which pore radius in A. is plotted versus volume of nitrogen adsorbed, milliliters per gram.

One thus obtains a series of values of volumes as a function of pore radius. In the next step, to obtain data on the frequency of occurrence of pores of a given radius, one makes a structure curve plot of volume versus r, as shown in Fig. 2 from the data in Table I. The frequency of occurrence of pores of a given radius is a function of the slope of the structure curve since frequency is the rate of change of V with respect to r. Therefore, the slopes of the structure curve are determined by reading V at unit increments of r, and obtaining ΔV for each unit increment of r. The values of r, V, ΔV (or dV/dr) are average r are shown in Table II below:

Table II.—Product 18, slopes from structure curve

| r, A. | V, ml. | dV/dr, ml./A. | r, ave., A. |
|---|---|---|---|
| 8 | 90.4 | | |
| 9 | 95.0 | 4.6 | 8.5 |
| 10 | 101.3 | 6.3 | 9.5 |
| 11 | 109.3 | 9.0 | 10.5 |
| 12 | 120.5 | 11.2 | 11.5 |
| 13 | 134.7 | 14.2 | 12.5 |
| 14 | 146.4 | 11.7 | 13.5 |
| 15 | 155.8 | 9.4 | 14.5 |
| 16 | 161.5 | 5.7 | 15.5 |
| 17 | 165.3 | 3.8 | 16.5 |
| 18 | 168.2 | 2.9 | 17.5 |
| 19 | 170.4 | 2.2 | 18.5 |
| 20 | 172.3 | 1.9 | 19.5 |
| 21 | 174.0 | 1.7 | 20.5 |
| 22 | 175.4 | 1.4 | 21.5 |
| 23 | 176.7 | 1.3 | 22.5 |
| 24 | 177.8 | 1.1 | 23.5 |
| 25 | 178.6 | 0.8 | 24.5 |

Figure 3:
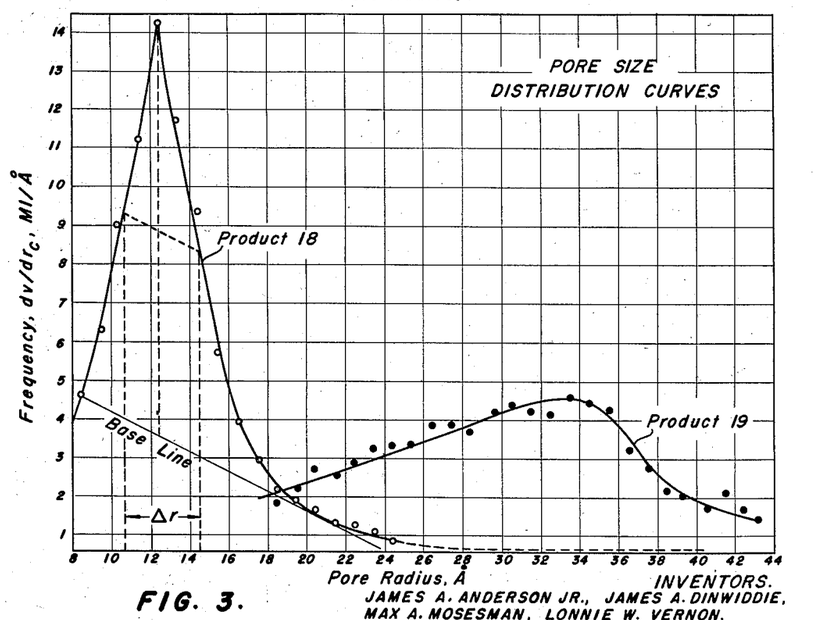
Fig. 3 is a pore distribution curve for products 18 and 19 in which pore radius in A. is plotted versus frequency of occurrence of pores of various sizes.

In the next step, to obtain a pore size distribution curve, $dV/dr$ is plotted versus average pore radius as shown in Fig. 3. This gives a frequency distribution of pores of a given radius. A similar plot is also shown for product 19 (obtained by heating product 18 for 24 hours at 1400° F.), the data having been obtained by the above described procedure. It is noted that the frequency curve for product 18 shows a sharp peak at about 13 A. which corresponds to the most frequent pore radius ($r_f$), and that the product is characterized by a relatively narrow and substantially symmetrical pore size distribution.

The curve for product 19 shows that several things occur on heat treatment of product 18. There is a substantial increase in the size of the pores and a corresponding marked increase in the range of pore sizes. However, the characteristic of most frequent pore size is retained, product 19 showing a most frequent pore radius of about 33 A.

A convenient method for characterizing the range of the more frequent pores has been found to be as follows: A base line is drawn from the lower extremities of the two branches of the pore distribution curve, generally from the low pore branch to break point of the high pore branch. A line parallel to the base line is drawn through the halfway point of a vertical line drawn from the base line to the apex of the pore distribution curve. Vertical lines drawn from each branch of the curve, from the points at which the halfway parallel line crosses them, down to the abscissa, give the range in Angstroms covered by the more frequent pores. Thus, for product 18, the pore range at one-half the vertical distance is from about 11 to 14 A., giving a pore spread ($\Delta r$) of 3 A. This method of designating pore radius range will be used herein.

Figure 4:
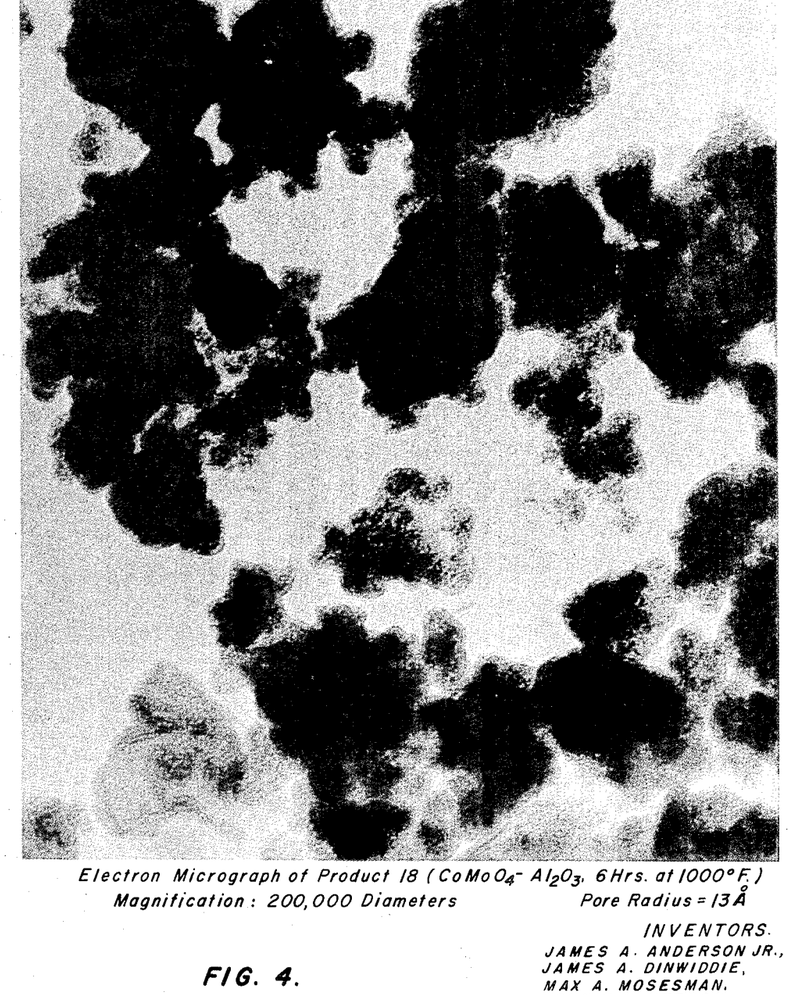
Figs. 4 and 5 are electron micrographs of products 18 and 19, respectively, taken at a total magnification of 200,000 diameters.
Figure 5:
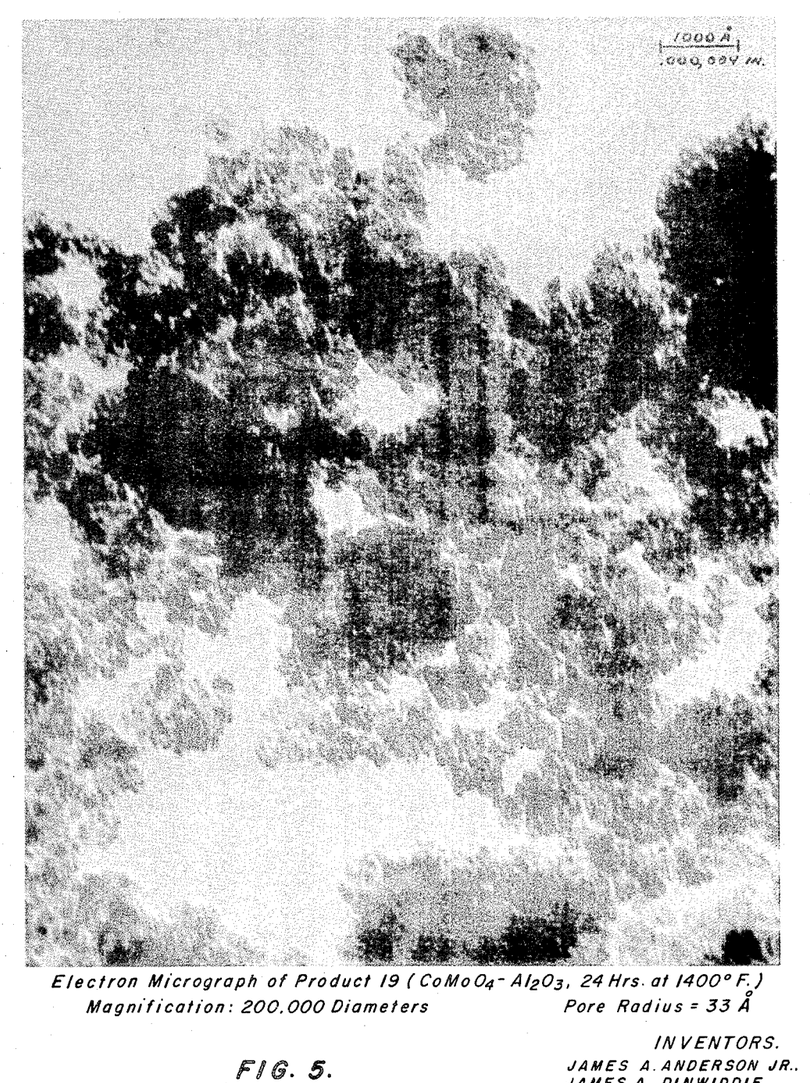

In order to confirm the validity of pore size data as calculated by the Kelvin equation and as modified by the above procedure, electron photomicrographs of products 18 and 19 were obtained under rigorously controlled experimental conditions at a total magnification of 200,000 diameters. These pictures are shown in Figures 4 and 5. The micropores in these pictures are the small open spaces between the essentially spherical particles comprising the aggregates; the large open spaces between aggregates are the result of the sample preparation technique and are completely devoid of catalyst matter. The dark spots in the pictures are due to areas in the catalyst sample of sufficient thickness to absorb the bombarding electrons completely, so that pore structure is not shown in the thick area. These electron micrographs afford direct visual evidence of the changes effected by severe heating of product 18 to form a wide range of large pores in product 19.

Statistical analytical procedures were employed to measure pore sizes in the pictures of Figs. 4 and 5. The pictures were projected onto a large screen, and hundreds of random measurements of pore diameters were made. Statistical treatment of the data give most frequent pore radii of 13 A. and 33 A. for products 18 and 19, respectively, which were almost precise checks of corresponding radii calculated from the Kelvin equation; this treatment also gives pore frequency curves closely checking those shown in Fig. 3. The use of the Kelvin equation for such calculations based on the hysteresis loop data is therefore open to little question. In this connection, the radii calculated from the Kelvin equation have not been corrected for the thickness of the adsorbed nitrogen layer, but the percent error is not large, particularly, when dealing with relatively large pore radii, as indicated by the excellent agreement with the electron micrographs.

The area under the pore size distribution curve (Fig. 3) is proportional to the pore volume indicated by the isotherm hysteresis loop. This thus recognizes that capillary condensation is primarily responsible for the hysteresis loop and, accordingly, is a direct measure of pore volume.

Conventional prior art practice is that of estimating an average pore radius from pore volume and specific surface values. The volume adsorbed at essentially unit relative pressure, i.e. the total volume adsorbed ($V_s$ on Fig. 1) or of this volume corrected by an arbitrary percentage or by subtracting the volume equivalent to a monolayer ($V_s - V_m$) are erroneous measures of pore volume because such volumes include the amount of nitrogen or other adsorbate adsorbed in multilayers. Consequently, average pore radii calculated from such data must always yield high values. This is shown in Table III-A, below which presents pore volume and radius data calculated by the prior art and present methods for products 18 and 19.

Table III-A

| Product No. | S, m²/g. | Vm, ml. (STP)/g. | Pore Volume, ml./g., based on— | | | Avg. Pore Radius, A., Based on—[1] | | | Most Frequent Pore Radius, A. | |
|---|---|---|---|---|---|---|---|---|---|---|
| | | | Vs | Vs−Vm | Vh | Vs | Vs−Vm | Vh | Calculated[2] | Measured[3] |
| 18 | 280 | 64 | .386 | .287 | .164 | 28 | 20 | 12 | 13 | 13 |
| 19 | 115 | 26 | .340 | .300 | .205 | 59 | 52 | 36 | 33 | 33 |

[1] Calculated by the formula $\frac{2 \times \text{Pore Volume}}{S}$
[2] Determined from pore size distribution curves from electron micrographs.
[3] Statistical determination.

The generally excellent agreement between the average pore radius based on $Vh$ and the most frequent pore sizes determined by the Kelvin equation and by the electron micrograph substantiates that the hysteresis volume is the correct volume to choose in determining micropore characteristics. Pore radii based on either $Vs$ or $Vs-Vm$ are over 1½ to 2 times higher than those based on $Vh$. These differences have been confirmed consistently in many comparative runs, and similar checks have been made on results reported in the prior art. It has been found that radii reported in the art and based on $Vs$ or a variation thereof, usually run from 2 to 3 times higher than those determined from $Vh$ in accordance with the present procedure for obtaining true pore sizes.

It was found that pore size, pore range or specific surface are not, taken individually, adequate criteria for explaining the relative effectiveness of microporous materials. It was further shown that both most frequent pore size and range of the more frequent pores influence contacting effectiveness particularly when the material being contacted is composed of mixed molecules having a relatively wide range of molecular sizes. It was subsequently found that a relationship between these inspections, which is called herein the pore size distribution (PD) factor, is a useful tool for defining porous compositions having special utility. This factor is obtained as follows:

$$PD = \frac{(D_f)^2 \Delta D_R}{10^4}$$

wherein:

$D_f$ = most frequent micropore diameter in A.
$\Delta D_R$ = range of more frequent pore diameters in A.

Since it is preferred to use diameters rather than radii in presenting pore data, $r_t$ and $\Delta r$ obtained by the above discussed procedure are simply doubled to obtain $D_f$ and $\Delta D_R$, respectively. The terms $D_t$ and $\Delta D_R$ are used in this specification and claims.

The PD factor increases as the most frequent pore diameter and/or the range of the more frequent pores increases. In effect, it gives a measure of pore distribution in terms of the range of sizes of the more frequent pores based on the size of the most frequent pore. Since prior art porous materials have been produced under conditions conducive to the formation of pores having relatively small diameters, or of larger pores having narrow, more frequent pore ranges, PD factors for such materials have been on the order of well below 5.0. In contrast, materials of the present invention range well above 5.0 up to as high as 400 or higher.

The above methods for defining physical properties of porous materials differ considerably from conventional prior art practices, not only in treatment of pore size but also in pore size range. For example, prior workers have mentioned "broad distributions" of pore sizes, for example, a 100 A. range, but such terminology has little meaning when it is considered that porous substances in general have extremely broad pore size ranges, frequently much in excess of 50 to 100 A., while actually having an extremely narrow spread of more frequent pores. This is shown by the data for products 18 and 19. The curves in Fig. 3 show only the significant pore sizes, but the total ranges for the products are much broader as shown below.

| Product | $\Delta D_R$ | Complete Range of Diameters, A.[1] | |
|---|---|---|---|
| | | Range | Spread |
| 18 | 6 | 19–320 | 301 |
| 19 | 22 | 39–240 | 201 |

[1] Determined from extremes of the hysteresis loop.

Whereas product 18 is actually characterized by having a narrow range of significant pores in comparison with product 19, a total range figure would indicate product 18 to have a much broader range than 19. The following comparisons are shown for several other products:

| Product | $\Delta D_R$ | Total Spread, A. |
|---|---|---|
| 1 | 16 | 122 |
| 4 | 38 | 177 |
| 5 | 12 | 186 |
| 6 | 6 | 208 |

It is thus seen that pore distribution has no real meaning unless considered in terms of the more frequent pores.

As a rule, the porous products of this invention will demonstrate a most fequent pore diameter, but in some cases the distribution curves will show a broad smooth distribution of more frequent pores with $V_s$ clearly defined $D_t$. In such cases $D_t$ is taken to be the same as the average pore diameter of the porous solid.

III. ACTIVITY TESTS—HYDRODESULFURIZATION

These runs were carried out in small-scale fixed bed units using as catalysts the products described in section I. The reactors generally consisted of an extra heavy KA2S pipe having a diameter ranging from 1¼" to 1½" and having lengths of catalyst bed from about 7" to 14". The reactors were provided with heating means and inlets for hydrocarbon feed and hydrogen, in addition to pumps, metering devices, product draw-off equipment, etc. In conducting a test, the reactor was charged with the desired catalyst, brought up to the temperature and pressure desired, usually with nitrogen, and then hydrocarbon feed and hydrogen would be charged continuously at the desired feed rates. As a rule, the unit would operate at constant conditions for 8 hours to obtain a representative product and then one of the operating conditions might be changed.

In runs made on gas oil feeds, the product was tested for sulfur and distillation characteristics, and plots were made for sulfur content versus feed rate and for percent distilling off at a given temperature, usually 430° F. versus feed rate when using the same catalyst and otherwise constant reaction conditions. Smooth curves were drawn through the points. Directly comparable data were obtained from the curves for different catalysts. Liquid space velocities ranging from as low as 0.2 to as high as about 5 volumes feed per volume of catalyst per hour were employed.

IV. INSPECTIONS ON GAS OIL FEED STOCKS

The gas oils used in the activity tests were obtained by distillation of West Texas crude. The inspections on feed stocks 1 and 2 are shown in Table III–B.

Table III–B.—Gas oil feed stock inspections

| Feed Stock No. | 1 | 2 |
|---|---|---|
| Inspections: | | |
| Gravity, ° API | 24.1 | 24.4 |
| Sulfur, Wt. Percent | 1.72 | 2.10 |
| ASTM Distillation (10 mm., corrected to 760 mm.)— | | |
| IBP, ° F | | |
| 5% off at ° F | 588 | |
| 10% | 668 | 596 |
| 20% | 713 | 661 |
| 30% | 738 | 710 |
| 40% | 769 | 748 |
| 50% | 807 | 788 |
| 60% | 846 | 830 |
| 70% | 884 | 875 |
| 80% | 925 | 926 |
| 90% | 977 | 990 |
| 95% | 1,011 | 1,043 |
| FBP, ° F | 1,032 | 1,068 |
| Average No. of C atoms at 50% point | 26 | 26 |
| Average Molecular Diameter, A.[1] | 38 | 38 |
| Range of molecular diameters of 10 to 90% fraction, A.[1] | 34–45 | 30–46 |
| Spread of 10–90% molecular diameters, A.[1] | 11 | 16 |

[1] Determined by Hermans et al. formula.

V. EXAMPLES

*Example 1.*—The effect of heat treatment in dry air on the physical characteristics of low silica, granular alumina containing 15% $CoMoO_4$ is shown in Table IV below. Pore size and distribution data were obtained by the procedures discussed in section II above.

Table IV

| Product No. | Heat Treatment, Hours at °F. | S, M²/g. | Vn, ml./g. | Dt, A. | DR, A. | ΔDR, A. | PD Factor |
|---|---|---|---|---|---|---|---|
| 1 | 6 at 1,200 | 210 | 0.161 | 38 | 28–44 | 16 | 2 |
| 6 | 24 at 1,400 [1] | 156 | 0.170 | 43 | 40–46 | 6 | 16 |
| 4 | 24 at 1,400 | 114 | 0.202 | 60 | 50–88 | 38 | 14 |
| 7 | 24 at 1,400 [2] | 99 | 0.162 | 66 | 32–92 | 60 | 26 |
| 5 | 24 at 1,500 | 82 | 0.170 | 114 | 104–116 | 12 | 16 |
| 8 | 12 at 1,500 | 82 | 0.201 | 86 | 74–92 | 18 | 14 |
| 9 | 24 at 1,500 [1] | 72 | 0.201 | 90 | 78–108 | 30 | 24 |

[1] Heat treated in large batches in unit different from that used for other products.
[2] Previously used and air regenerated before heat treatment.

In general, heating these products in dry air in the range of 1400° to 1500° F. decreased specific surface and increased most frequent pore size. However, it was found that the extent and level of heat treatment could not be used as a reliable guide for predicting the physical characteristics of the material without taking into account such factors as type and configuration of the heating unit, rate of increasing temperature up to the desired level, and the like which influence pore size and distribution. Since all of these materials have the same chemical composition and were prepared by the same general procedure, it is seen that attention must be given to the physical analysis as a final guide to determine precise pore size and distribution characteristics.

Example 2.—The effect of silica in the alumina base is shown in Table V-A below:

Table V-A

| Product No. | Silica Content, Wt. Percentage | Heat Treatment, Hrs. at °F. | S | Vn | Dt | ΔDR | PD |
|---|---|---|---|---|---|---|---|
| 10 | 5 | 4 at 1,200 | 254 | 0.190 | 28 | 3 | <1 |
| 11 | 5 | 24 at 1,400 | 193 | 0.176 | 40 | 16 | 3 |
| 26 | <0.5 | 6 at 1,112 | 145 | 0.163 | 50 | 14 | 4 |
| 27 | 0 | 24 at 1,400 | 116 | 0.178 | 68 | 52 | 24 |

These products, which were all prepared by substantially the same procedure and had the same chemical composition with the exception of the silica content, were carefully heated to avoid variations in heating rate, etc. It was found that the silica-containing product would not respond to severe heat treatment in dry air to any appreciable extent, product 26, heated at 1112° F., having higher pore sizes and PD factors than either of the silica-containing materials.

The improved response ordinarily obtained in heat treating "granular" alumina compared to "spray dried" is illustrated in Table V-B:

Table V-B

| Product No. | Type of Alumina Base | Heat Treatment, Hrs. at °F. | S | Vh | Dt | ΔDR | PD |
|---|---|---|---|---|---|---|---|
| 12 | Spray dried | 6 at 1,112 | 198 | 0.178 | 37 | 16 | 2 |
| 13 | do | 24 at 1,400 | 140 | 0.193 | 50 | 20 | 5 |
| 14 | do | 24 at 1,500 | 92 | 0.224 | 123 | 10 | 15 |
| 26 | Granular | 6 at 1,112 | 145 | 0.163 | 50 | 14 | 4 |
| 27 | do | 24 at 1,400 | 116 | 0.178 | 68 | 52 | 24 |

All the products in Table V-B were derived from commercially available cobalt molybdate on low silica gamma alumina. It is seen that the product with a base of "granular" alumina responds more readily to heat treatment, with improved results, when compared to the product on a base of "spray dried" gamma alumina.

Example 3.—The effect of various supported chemicals on gamma alumina is shown in Table VI, below:

Table VI

| Product No. | Supported Constituent | | Heat Treat, Hrs. at °F. | S | Vh | Dt | ΔDR | PD |
|---|---|---|---|---|---|---|---|---|
| | Type | Wt. percent | | | | | | |
| 16 | None | | 24 at 1,400 | 214 | 0.267 | 50 | 10 | 3 |
| 17 | None | | 24 at 1,550 | 218 | 0.258 | 54 | 6 | 2 |
| 18 | CoMoO₄ | 15 | 6 at 1,000 | 280 | 0.164 | 26 | 6 | <1 |
| 19 | CoMoO₄ | 15 | 24 at 1,400 | 115 | 0.205 | 66 | 22 | 10 |
| 20 | MoO₃ | 11.5 | 24 at 1,450 | 137 | 0.224 | 66 | 8 | 4 |
| 21 | MoO₃ | 7.8 | 24 at 1,500 | 39 | 0.239 | 216 | 66 | 308 |
| 22 | MoO₃ | 6.9 | 24 at 1,550 | 46 | 0.239 | 266 | 18 | 128 |
| 23 | CoO | 5.1 | 24 at 1,450 | 190 | 0.279 | 42 | 22 | 4 |
| 24 | CoO | 5.1 | 24 at 1,500 | 174 | 0.232 | 42 | 14 | 3 |
| 25 | CoO | 5.1 | 24 at 1,550 | 151 | 0.247 | 44 | 18 | 3 |

The particular gamma alumina tested would not respond to increase in pore sizes beyond about 50 A. when heated in dry air up to temperatures as high as 1550° F., and PD factors remained low. As shown in previous examples, $CoMoO_4$ is an effective promoter for this purpose when elevated temperatures are used, such as 1400° F. Molybdena is quite effective in producing large pore catalysts having most frequent pore diameters of above 200 and PD factors as high as about 300 when using high heat-treating temperatures. Severe heating, i.e. 1550° F., tends to reduce the PD but increase $D_f$. The presence of cobalt tends to retard port size growth in comparison with gamma alumina alone in the temperature range tested.

Example 4.—Hydrodesulfurization runs were carried out with products 2, 4, 5, 6 and 19 as catalysts at a temperature of about 765° F., a pressure of about 400 p.s.i.g. and in the presence of about 6000 standard cubic feet (s.c.f.) of hydrogen per barrel of gas oil (feed stock 1). Liquid space velocities were varied from about 0.25 up to as high as 5 v./v./hr. Pertinent test data along with the physical characteristics of the catalyst are shown in Table VII, below:

Table VII

| Catalyst Information | | | Hydrocarbon Product Sulfur Content, Wt. Percent at Indicated v./v./hr. | | | | | |
|---|---|---|---|---|---|---|---|---|
| Product No. | $D_f$ | $\Delta D_R$ | PD | 0.25 | 1.0 | 1.5 | 2.5 | 3.5 | 5.0 |
| 2 | <35 | <10 | <1 | 0.035 | 0.15 | 0.23 | (¹) | (¹) | (¹) |
| 6 | 43 | 6 | 1 | (¹) | 0.11 | 0.16 | 0.25 | 0.36 | 0.5 |
| 4 | 60 | 38 | 14 | 0.02 | 0.09 | 0.12 | (¹) | (¹) | (¹) |
| 19 | 66 | 22 | 10 | (¹) | (¹) | 0.12 | 0.22 | 0.3 | (¹) |
| 5 | 114 | 12 | 16 | 0.035 | 0.10 | 0.13 | 0.21 | 0.27 | 0.32 |

¹ Not determined.

Products 2 and 6, each having relatively low $D_f$ and low PD factors, were consistently less active than products 4 and 19 which had PD factors of 14 and 10, respectively. Up to a space velocity of about 1.5 v./v./hr., product 5, which had a slightly higher PD factor, was intermediate in activity. At space velocities of 2.5 v./v./hr. and above, product 5 was most active. A high $D_f$ coupled with a substantial PD factor is preferred at higher space velocities.

*Example 5.*—In this example, a series of hydrodesulfurization runs were carried out on a gas oil (feed stock 2) using various catalysts. Run conditions were maintained at about 765° F., 400 p.s.i.g., 2750 s.f.c. of hydrogen per barrel of gas oil, and space velocities varying from about 1.0 to 3.5 v./v./hr. The data are in Table VIII, below:

Table VIII

| Catalyst Information | | | | H.C. Product Sulfur Content, Wt. Percent at Indicated v./v./hr. | | | |
|---|---|---|---|---|---|---|---|
| Product No. | $D_f$ | $\Delta D_R$ | PD | 1.0 | 1.5 | 2.5 | 3.5 |
| 12 | 37 | 16 | 2 | 0.12 | 0.17 | 0.35 | (¹) |
| 13 | 50 | 20 | 5 | 0.09 | 0.15 | 0.27 | 0.41 |
| 7 | 66 | 60 | 26 | (¹) | (¹) | 0.13 | 0.25 |

¹ Not determined.

It is seen that increasing $D_f$ above 50 and PD above about 5 gave catalysts having superior properties. Product 7 was superior.

*Example 6.*—The following data show the effect of conducting runs on catalysts having substantially the same $D_f$ but varying PD factors and on catalysts having substantially constant PD but varying $D_f$. This required a comparison of data from runs carried out in Examples 4 and 5, which used feed stocks having different sulfur contents, different hydrogen feed rates and slightly different reactors, although other conditions were constant. To show the validity of comparing such data, product 6 was tested in both sets of runs, and at a v./v./hr. of 2.5, this catalyst gave a percent sulfur removal of 85.5 at Example 4 conditions and of 85.6 under Example 5 conditions. In view of this excellent check, the following comparisons have been made on a percent sulfur removal basis. Data are presented in Table IX, below:

Table IX

| Product No. | $D_f$ | $\Delta D_R$ | PD | Feed Stock Used | Percent Sulfur Removed from Feed Stock at Indicated v/v/hr. | |
|---|---|---|---|---|---|---|
| | | | | | 2.5 | 3.5 |
| 7 | 66 | 60 | 26 | ¹ 2 | 93.8 | 88.0 |
| 19 | 66 | 22 | 10 | ² 1 | 87.2 | 82.5 |
| 5 | 114 | 12 | 16 | ² 1 | 87.6 | 84.3 |
| 8 | 86 | 18 | 14 | ¹ 2 | 93.8 | 88.0 |

¹ Example 5 test conditions.
² Example 4 test conditions.

At a constant $D_f$ of 66 A., it is seen that the high $\Delta D_R$ product permitted almost 7% more sulfur to be removed than did the lower PD product.

When maintaining PD factors substantially constant (products 5 and 8), it is seen that product 8 is superior at the space velocities used. Thus a $D_f$ of about 60 to 85 is preferred for gas oil at these conditions.

Figure 6:
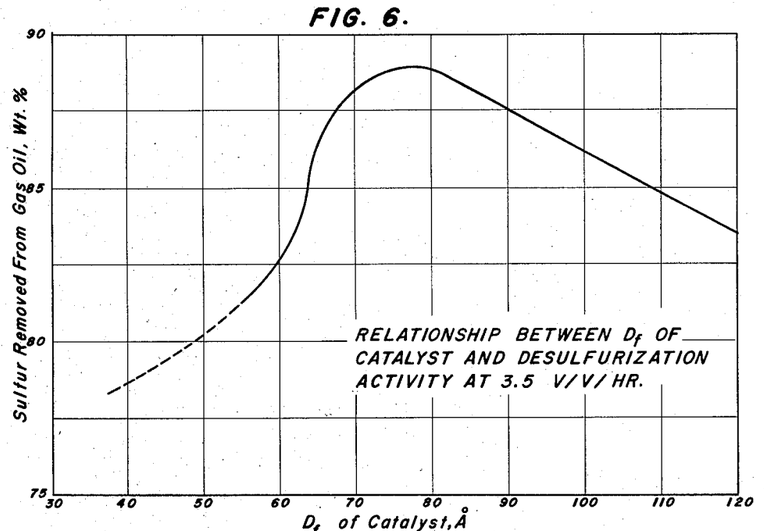
Fig. 6 is a plot of percent sulfur removed from gas oil versus the $D_f$ of various catalysts obtained in desulfurization runs conducted at 3.5 v./v./hr.
Figure 7:
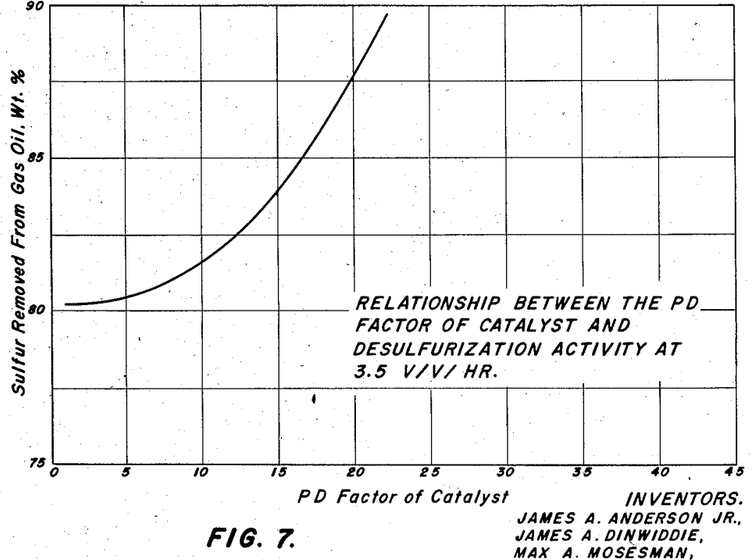
Fig. 7 is a plot of percent sulfur removed from gas oil versus the PD factor of various catalysts obtained in desulfurization runs conducted at 3.5 v./v./hr.

The data from the various examples on gas oil desulfurization at 3.5 v./v./hr. are plotted in Figs. 6 and 7. Fig. 6 presenting the relation between percent sulfur removal and $D_f$, shows that $D_f$ values in the range of about 60 to 130 were preferred, with those from 65 to 100 being especially useful. Since both gas oils used in these runs had average molecular diameters of 38 A., it is seen that it is preferable to select a catalyst such that the ratio of $D_f$ to feed average molecular diameter is in the range of about 1.5 to 3.5, preferably 1.7 to 2.5.

In Fig. 7, showing the relation between percent sulfur removal and PD factor, a PD factor of above 5, especially above 10, is most useful. These correspond to a PD factor to feed average molecular diameter ratio of above 0.13, preferably above 0.25.

*Example 7.*—The data presented in Table X were obtained under the conditions used for Example 4 runs with feed stock 1:

Table X

| Product No. | $D_f$ | $\Delta D_R$ | PD | Type of Alumina Base | Sulfur in H.C. Product, Wt. Percent, at v./v./hr. | | | |
|---|---|---|---|---|---|---|---|---|
| | | | | | 0.25 | 1.0 | 1.5 | 2.5 |
| 10 | 28 | 3 | 1 | Silica-Containing | 0.02 | 0.10 | 0.20 | (¹) |
| 11 | 40 | 16 | 3 | ___do___ | 0.02 | 0.10 | 0.20 | ² 0.4 |
| 4 | 60 | 38 | 14 | Silica Free | 0.02 | 0.09 | 0.12 | (¹) |
| 19 | 66 | 22 | 10 | ___do___ | (¹) | (¹) | 0.12 | 0.22 |

¹ Not determined.
² Extrapolated.

The silica-containing catalysts, products 10 and 11, showed a high activity at low feed rates, and were as active as product 4 at these feed levels. However, the desulfurization effectiveness of both products 10 and 11 decreased rapidly as feed rate increased; at high space velocities, products 4 and 19 were almost twice as effective as the silica-containing products which had low PD values. Products 10 and 11 were representative of the prior art catalysts. These rata strikingly demonstrate the point that inherent chemical activity is controlling at long contact times which permit adequate time for the molecules to come into contact with the catalyst, but that for materials of a given catalytic activity, pore size and distribution are controlling at higher feed rates.

*Example 8.*—In order to illustrate the invention further, a lubricating oil stock was hydrofined under relatively mild conditions in the presence of hydrogen to improve the color and colorhold characteristics of the lubricating oil. Products 1 and 4 were used as catalysts in hydrofining operations in treating a 1000 SSU at 100° F. Coastal distillate. Hydrofining operations at 700° F. and 750 pounds per square inch gauge were conducted under conditions shown in Table XI. The feed stock employed in these runs had a sulfur content of 0.25% by weight and had an average molecular diameter of about 41 A.

Table XI

| Catalyst, Product No. | 1 | 4 | 4 |
|---|---|---|---|
| $D_f$, A | 38 | 60 | 60 |
| PD | 2 | 14 | 14 |
| Feed Rate, v./v./hr. | 1.0 | 1.0 | 4.0 |
| $H_2$ Rate, ft.³/Bbl | 950 | 975 | 375 |
| Inspections on Product: | | | |
| Neut. Value | 0.000 | 0.005 | 0.013 |
| Vis./100° F., SSU | 779 | 745 | 861 |
| Vis./210° F., SSU | 63.7 | 62.7 | 65.5 |
| V. I. | 33 | 34 | 29 |
| Color, T.R. | 14¼ | 16½ | 14 |
| Colorhold, T.R. | 11 | 13½ | 10 |
| S. Wt. Percent | 0.11 | 0.10 | 0.13 |
| Vol. Percent Yield | 98.3 | 98.9 | 99.7 |
| Ratio $D_f$ to average feed molecular diameter | 0.9 | 1.5 | 1.5 |
| Ratio PD to average feed molecular diameter | 0.05 | 0.34 | 0.34 |

The data obtained at 1.0 v./v./hr. show that the use of product 4 effected a considerable improvement in the color and the colorhold without, at the same time, effecting a serious decrease in viscosity in comparison with product 1 as catalyst. The percent desulfurization was about the same in all of the cases. Consideration of the data obtained at 4 v./v./hr., however, shows that high PD product 4 gave about the same color and colorhold improvement at 4 v./v./hr. as the low PD product 1 at 1 v./v./hr. Furthermore, in the operation in accordance with the present invention, there was significantly less degradation in viscosity at 4 v./v./hr. than at the lower feed rate. Although the neutralization value was slightly higher than that obtained with the low PD catalyst, the higher value is not considered excessive and may be suitably reduced, if desired, by treatment with an alkaline reagent, such as sodium hydroxide and the like.

The higher viscosities obtained at 4 v./v./hr. signify decreased hydrocracking activity of the high PD catalyst.

*Example 9.*—A series of hydrofining runs were carried out on a Coastal lubricant distillate similar to that used in Example 8 using various catalysts at 750 p.s.i.g., 700° F. and 1000 cu. ft. of hydrogen per barrel of oil and a feed rate of 2 v./v./hr. The results are shown in Table XII:

Table XII

| Catalyst Information | | | | | |
|---|---|---|---|---|---|
| Product Used | 12 | 13 | 4 | 14 | 13 |
| $D_f$, A | 37 | 50 | 60 | 123 | 50 |
| PD | 2 | 5 | 14 | 15 | 5 |
| Pill Size | ⅛″ | ⅛″ | ⅛″ | ⅛″ | 10-20 mesh |

| | Fresh Feed | | | | | |
|---|---|---|---|---|---|---|
| Inspections on Liquid Product: | | | | | | |
| Vis./100° F., SSU | 1,023 | 806 | 764 | 785 | 794 | 741 |
| Vis./210° F., SSU | 69.7 | 64.7 | 63.6 | 64.1 | 64.2 | 62.9 |
| Color, T.R. | (¹) | 10½ | 10 | 11½ | 12 | 15½ |
| Colorhold, T.R. | (¹) | 5 | 9½ | 10 | 9½ | 12¾ |
| Ave. Molecular Diameter, A | 41 | | | | | |
| Ratio: $D_f$ of catalyst to average feed molecular diameter | | 0.9 | 1.2 | 1.5 | 3 | 1.2 |
| Radio: PD of catalyst to average feed molecular diameter | | 0.05 | 0.1 | 0.34 | 0.37 | 0. |

¹ Dark.

These catalysts, except for product 4, were all obtained by depositing CoMo on spray dried alumina, and were prepared from a common catalyst (product 12) by heat treating as pointed out previously. At constant particle size, it is seen that using a catalyst having a PD factor of about 2 gave an unstable product having poor colorhold, but the higher PD catalysts (5 and above) gave superior stable products. The high PD catalyst, product 14, having a high $D_f$, improved both color and colorhold and demonstrated little more cracking tendency than product 12. The use of small particles (10–20 mesh) instead of ⅛″ pills greatly improved the decolorizing ability of product 13, with some increase in cracking.

*Example 10.*—A series of runs were carried out on the same catalysts and under the same conditions used in Example 9, with the exception that the feed rate was 1 v./v./hr. The feed stock employed was a conventionally deasphalted, dewaxed, phenol extracted Panhandle residuum. The data are presented in Table XIII, below:

Table XIII

| Catalyst Information | | | |
|---|---|---|---|
| Product Used ¹ | 12 | 13 | 14 |
| $D_f$, A | 37 | 50 | 123 |
| PD | 2 | 5 | 15 |

| | Fresh Feed | | | |
|---|---|---|---|---|
| Inspections on Liquid Product: | | | | |
| Vis/100° F., SSU | 2,817 | 2,009 | 1,910 | 1,981 |
| Vis/210° F., SSU | 177 | 144.5 | 141.5 | 141.4 |
| Color, TR | ½ | 1¾ | 2½ | 4¼ |
| Colorhold, TR | | 1¼ | 1¾ | 1¾ |
| Sulfur, Wt. percent | 0.43 | 0.12 | 0.07 | 0.06 |
| U.V. Coeff. at 340 mu | 0.56 | 0.29 | 0.38 | 0.31 |
| Ave. Mol. Dia., A | 45 | | | |
| Ratio, $D_f$ to Ave. Feed Mol. Dia | | 0.8 | 1.1 | 2.7 |
| Ratio, PD to Ave. Feed Mol. Dia | | 0.045 | 0.1 | 0.33 |

¹ ⅛″ pills in all cases.

Here again, the large pore, high PD catalyst was superior in decolorizing ability, as well as desulfurization ability, and demonstrated less tendency to cause viscosity degradation than product 13. The decreased U.V. coefficient obtained with product 14 is also indicative of a greater degree of hydrogenation than that obtained with product 13.

*Example 11.*—Catalyst preparations were carried out using Bayerite and gibbsite as alumina bases. The Bayerite was prepared in a conventional manner by hydrolyzing aluminum alcoholate with excess water. The gibbsite was produced conventionally by the Bayer process. These aluminas were impregnated with cobalt molybdate in order to form a final composition which would contain 15 weight percent of active ingredients. Separate batches of each preparation were heat treated in dry moving air for 12 hours at 1300° and 1400° F., respectively. The results are shown in Table XIV below, along with physical inspections on the finished catalysts:

Table XIV

| Alumina Used | $CoMoO_3$, Wt. percent | Heat Treatment, Hours at ° F. | Information on Heated Catalysts | | | | | |
|---|---|---|---|---|---|---|---|---|
| | | | S | $V_n$ | $D_f$, A | $D_R$ | $\Delta D_R$ | PD |
| Bayerite | 15 | 12 at 1,300 | 169 | 0.292 | 72 | 66–76 | 10 | 5 |
| Do | 15 | 12 at 1,400 | 70 | 0.193 | 96 | 50–128 | 78 | 72 |
| Gibbsite | 15 | 12 at 1,300 | 72 | 0.162 | 66 | 46–02 | 46 | 20 |
| Do | 15 | 12 at 1,400 | 45 | 0.178 | 120 | 104–162 | 58 | 228 |

It is noted that at 1300° F., Bayerite did not respond to the formation of a material having a high PD factor although the most frequent pore diameter was 72° A. At 1400° F. both $D_f$ and PD were improved appreciably. Gibbsite in the presence of cobalt molybdate responded to the formation of high $D_f$ and high PD factors at both 1300° and 1400° F. It is probable that, for most purposes, the preparation made at 1400° F. would be less preferable from the standpoint of activity because of the low surface area obtained at this high temperature.

*Example 12.*—A catalyst having extremely large pores above about 1000 A. was prepared by using a modification of the procedure to prepare product 4. The modified product was prepared by powdering a mixture of product 1 and 15% of hydrogenated corn oils, pilling the mixture into ⅛ by ⅛ inch pills and then heating in moving dry air for 24 hours at 1400° F. The desulfurization activity of this catalyst was obtained by carrying out a run under the conditions used in Example 4 with feed stock 1. Similar runs were also made using product 4 as catalysts both in the form of ⅛ inch pills and 10–20 mesh particle size. The data are shown in Table XV, below:

Table XV

| Product No. | Removable Solid Used in Preparation | Catalyst Particle Size | Percent Sulfur Removed From Gas Oil at 2.0 v./v./hr. |
|---|---|---|---|
| 4 | No | ⅛″ x ⅛″ | 90.4 |
| 4 | No | 10–20 Mesh | 93.6 |
| Modified Product 4 | Yes | ⅛″ x ⅛″ | 93.6 |

It is seen that the modified product 4, containing extremely large pores and having a most frequent pore diameter of above about 60 A., is considerably more active than product 4 when the products were tested in the same particle size. The modified product was also as active as the 10 to 20 mesh particles of product 4. This represents a distinct advantage for the larger pore catalyst since it is possible to use relatively large particles and, therefore, decrease pressure drop through a fixed bed unit in contrast to a smaller pore size catalyst using smaller particles. The structural strength of the modified product 4 was somewhat less than that of the other products which indicates the desirability of using less of the removable solid during the preparation procedure or of introducing the removable solid into the alumina during the initial stages of preparation.

*Example 13.*—A run was carried out in which a West Texas crude oil was hydrodesulfurized employing, as catalyst, product 13. The unit employed a fixed bed of catalyst. The product from the run after 16 hours of operation was analyzed and then a distillation was made on the product following which sulfur determinations were made on the individual fractions of the product. The results are presented in Table XVI, below:

Table XVI

HYDRODESULFURIZATION OF WEST TEXAS CRUDE

Feed stock inspections: 32.3° API, 2.04 wt. percent sulfur.
Average molecular diameter about 35.
Catalyst: Product 13 ($D_f$ of 50 A. and PD of 5).
Reaction conditions: 800 p.s.i.g., 750° F., 1.0 v./v./hr., hydrogen feed rate—1650 cu. ft./bbl.
Overall product: 94.1% sulfur removal, 300 cu. ft. $H_2$ consumed per barrel of feed.

CRUDE ASSAY OF FEED AND PRODUCT

| Crude Assay Fraction: | Feed | | Product | |
|---|---|---|---|---|
| | Vol. Percent | Wt. Percent S | Vol. Percent | Wt. Percent S |
| C₅–375° F. Naphtha | 27.8 | 0.15 | 28.5 | 0.01 |
| 375°–530° F. Kerosene | 16.0 | 0.56 | 18.4 | 0.02 |
| 530°–600° F. Light Gas Oil | 7.0 | 1.32 | 8.5 | 0.018 |
| 600°–1,040° F. Gas Oil | 34.2 | 1.99 | 34.8 | 0.24 |
| 1,040° F.+Residuum | 13.6 | 4.80 | 6.7 | 0.77 |
| Total | 100.6 | 2.04 | 96.9 | 0.12 |

A high percentage of sulfur removal was obtained during this run at a relatively low hydrogen consumption rate. The analyses on the individual fractions of the feed and product showed that the sulfur contents of the individual fractions of the product were extremely low, making them much more suitable for use in cracking and reforming operations, as blending stocks and the like than those from the untreated crude. A desirable reduction in the percentage of residuum boiling above 1040° F. was also obtained during the run. The catalyst used in this run had relatively low $D_f$ and PD factors and the ratios of $D_f$ to feed average molecular diameter and of PD to feed average molecular diameter were 1.4 and 0.14, respectively. Equivalent results may be obtained at much higher feed rates by using a catalyst having higher $D_f$ and PD values.

*Example 14.*—A 12-hour hydrodesulfurization run was carried out on a reduced West Texas crude oil from which fractions boiling below about 430° F. had been removed by distillation. Product 29 was employed as the catalyst in the fixed bed run. Conditions and results are presented in Table XVII, below:

Table XVII

HYDRODESULFURIZATION OF REDUCED WEST TEXAS CRUDE

Feed stock inspections, average molecular diameter about 40 A.
Catalyst: Product 29 ($D_f$ of 84 A. and PD of 11).
Reaction conditions: 800 p.s.i.g., 820° F., 1.0 v./v./hr., 2950 cu. ft. $H_2$/bbl.

PRODUCT YIELDS AND INSPECTIONS

| | Feed | Product |
|---|---|---|
| Total Liquid: | | |
| Gravity, ° API | 19.0 | 28.7 |
| Sulfur, Wt. Percent | 2.58 | 0.22 |
| Percent Desulfurization | | 92 |
| Product Yields: | | |
| C₃ and lighter, Wt. Percent | 0 | 2.0 |
| C₄ Vol. Percent | 0 | 1.4 |
| C₅–430° F. Vol. Percent | 0 | 11.8 |
| 430°–650° F., Vol. Percent | 14.7 | 32.9 |
| 650°–1,040° F., Vol. Percent | 61.9 | 51.9 |
| 1,040° F. and heavier, Vol. Percent | 23.4 | 7.7 |

Under the conditions used, it is noted that the high $D_f$ catalyst employed gave excellent desulfurization and desirable hydrogenation and/or hydrocracking to lower boiling products. Approximately 15% of products boiling below 430° F. were formed during the run, and the percentage of 1040° F. and heavier materials was reduced from about 23% to about 8%.

*Example 15.*—A fixed bed hydrogenation operation was carried out on a West Texas asphalt employing as catalyst product 9. Pertinent data are given in Table XVIII below:

Table XVIII

MILD HYDROGENATION OF ASPHALT

Feed stock: Asphalt obtained by conventional propane deasphalting of West Texas residuum (13.9 vol. percent bottoms of West Texas crude).
Catalyst: Product 9($D_f$—90 A., PD—24).

Run conditions: 800 p.s.i.g., 1.8 v./v./hr., 2200 cu. ft. H₂/bbl. The asphalt was passed through the catalyst bed three times, with the catalyst being washed with gas oil from each pass. Temperatures varied within the range of 710°–750° F.

INSPECTIONS ON FEED AND PRODUCTS:

|  | Feed | Product |
|---|---|---|
| Fractions, Vol. Percent: | | |
| IBP–650° F | 0 | 3.1 |
| 650°–1,000° F | 0 | 16.6 |
| 1,000° F. and heavier | 100 | 80.3 |
| Inspections on Total Liquid: | | |
| Gravity, ° API | 0.6 | 5.6 |
| Sulfur, Wt. Percent | 5.1 | 2.5 |
| Naphtha Insolubles, Wt. Percent | 12.3 | 6.4 |

A substantial reduction in naphtha insolubles and sulfur content was obtained on the total product. A yield of hydrocarbons boiling below 1000° of about 20% was obtained.

What is claimed is:

1. A process for preparing an improved gamma alumina catalyst support which comprises forming a substantially silica-free gamma alumina having a PD factor of below about 3 and heating said gamma alumina under pore growth promoting conditions in the presence of steam at a pressure of from about atmospheric pressure to about 1000 p.s.i.g. and a temperature of from about 500° to about 1500° F. for a period of time sufficient to provide a gamma alumina product having a PD factor of at least 20, a $D_f$ within the range of about 60 to 400 A. and a $\Delta D_R$ within the range of about 20 to 100 A.

2. A process for preparing an improved gamma alumina catalyst support which comprises heating a mixture of substantially silica-free gamma alumina with a solid decomposable gas-forming material which is insoluble in and immiscible with said gamma alumina at a temperature within the range of about 1350° to about 1550° F. for a period of time sufficient to decompose said material and to provide a gamma alumina base having a PD factor of at least 10, a $D_f$ within the range of about 60 to 400 A. and a $\Delta D_R$ within the range of about 10 to 100 A., said solid decomposable gas-forming material being selected from the class consisting of hydrogenated corn oil, maleic anhydride, ammonium carbonate, ammonium oxalate, condensed ring aromatic hydrocarbons and hydrazine oxalate.

3. A porous solid catalyst consisting essentially of a substantially silica-free gamma alumina base and a catalytically active component selected from the group consisting of metals and metal compounds of the elements of columns VI and VII, rows 2 to 5, of the periodic table, said catalyst being characterized by a $\Delta D_R$ in the range from about 20 to 100 A., a $D_f$ in the range from about 60 to 400 A. and a PD factor of at least 20.

4. A porous solid catalyst for contacting high molecular weight organic materials comprising an oxygen-containing compound of molybdenum supported on substantially silica-free gamma alumina, characterized by a $D_f$ in the range of about 60 A. to 200 A., in a $\Delta D_R$ in the range from about 20 to 100 A., and a PD factor of at least 20.

5. A product as in claim 4 wherein said $\Delta D_R$ is in the range from 20 A. to 75 A.

6. In a process wherein a hydrocarbon feed stock is contacted under conversion conditions with a porous solid contacting agent consisting essentially of substantially silica-free gamma alumina having deposited thereon a component selected from the group consisting of metals and metal compounds of the elements of columns VI and VII, rows 2 to 5, of the periodic table, the method for improving the efficiency of contact between the contacting agent and said feed stock which comprises selecting as the contacting agent a solid material characterized by having a $D_f$ within the range of about 60 to 400 A., a $\Delta D_R$ within the range of 20 to 100 A. and a PD factor of about 20, and wherein the ratio of $D_f$ to the average molecular diameter in A. of said feed stock is in the range of about 1.2 to 4, and using said solid material in said process, said feed stock boiling above about 450° F.

7. A process as in claim 6 wherein the said $D_f$ is within the range of about 75 to 300 A.

8. A process as in claim 6 wherein said $D_f$ is from about 1.5 to about 3.5 times greater than the average molecular diameter in A. of said feed stock.

9. In a hydrocarbon conversion process in which a normally liquid petroleum hydrocarbon feed stock comprising a mixture of molecules having an average diameter in A. in excess of about 30 A. is contacted with hydrogen, the improvement which comprises the steps of bringing said feed stock into contact with said hydrogen in the presence of a fixed bed of catalyst comprising a molybdenum-containing component supported on substantially silica-free gamma alumina, said catalyst having a PD factor within the range of about 20 to 500, a $\Delta D_R$ within the range of about 20 to 100 A. and a $D_f$ of above about 60, said contact being carried out in a liquid space velocity of about 1.5 v./v./hr., the ratio of $D_f$ to the average molecular diameter of the said feed stock being in the range from about 1.2 to about 4.

10. A process for desulfurizing a sulfur-containing hydrocarbon feed stock comprising a mixture of molecules having an average molecular diameter in A. in excess of about 30 A., said feed stock having a mid-boiling point above 700° F., said process comprising the steps of contacting said feed stock with hydrogen and a catalyst under desulfurization conditions, said catalyst comprising oxides of molybdenum and cobalt supported on substantially silica-free gamma alumina and being characterized by a $D_f$ within the range of about 75 to 200 A., a PD factor of about 20 and a $\Delta D_R$ in the range from about 20 to about 75 A., the ratio of $D_f$ to the average molecular diameter of said feed stock being within the range of about 1.2 to 4.

References Cited in the file of this patent

UNITED STATES PATENTS

| 2,422,372 | Smith et al. | June 17, 1947 |
| 2,432,286 | Claussen et al. | Dec. 9, 1947 |
| 2,440,673 | Jones | May 4, 1948 |
| 2,542,970 | Jones | Feb. 27, 1951 |
| 2,657,184 | Ashley | Oct. 27, 1953 |
| 2,697,683 | Engel et al. | Dec. 21, 1954 |